(12) United States Patent
Green

(10) Patent No.: US 10,536,390 B1
(45) Date of Patent: Jan. 14, 2020

(54) REQUESTING EMBEDDED HYPERMEDIA RESOURCES IN DATA INTERCHANGE FORMAT DOCUMENTS

(71) Applicant: Amazon Technologies, Inc., Seattle, WA (US)

(72) Inventor: Ryan Paul Green, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 15/404,024

(22) Filed: Jan. 11, 2017

(51) Int. Cl.
*G06F 13/00* (2006.01)
*H04L 12/911* (2013.01)
*H04L 29/08* (2006.01)

(52) U.S. Cl.
CPC ............ *H04L 47/70* (2013.01); *H04L 67/02* (2013.01); *H04L 67/10* (2013.01)

(58) Field of Classification Search
CPC .......... H04L 47/70; H04L 67/02; H04L 67/10
USPC ................ 709/217–219, 227–229, 203, 245; 707/721, 713, 768
See application file for complete search history.

(56) References Cited

U.S. PATENT DOCUMENTS

| | | | | |
|---|---|---|---|---|
| 9,665,410 B2* | 5/2017 | Muguda | ................... | G06F 9/54 |
| 9,813,840 B2* | 11/2017 | Tofighbakhsh | ......... | H04W 4/60 |
| 10,318,727 B2* | 6/2019 | Kimura | ................. | G06F 21/552 |
| 10,362,141 B1* | 7/2019 | Thompson | | |
| 2014/0282626 A1* | 9/2014 | Muguda | ................... | G06F 9/54 |
| | | | | 719/328 |
| 2015/0095303 A1* | 4/2015 | Sonmez | ................. | G06N 5/003 |
| | | | | 707/707 |
| 2015/0142871 A1* | 5/2015 | Tofighbakhsh | ......... | H04W 4/60 |
| | | | | 709/203 |
| 2017/0262628 A1* | 9/2017 | Kimura | ................. | G06F 21/552 |
| 2017/0329657 A1* | 11/2017 | Kumaresan | ............ | G06F 9/541 |

* cited by examiner

*Primary Examiner* — Kenneth R Coulter
(74) *Attorney, Agent, or Firm* — Thorpe North & Western, LLP

(57) ABSTRACT

A technology is described for embedding hypermedia resources in data interchange format documents. An example method may include receiving an instruction to request a first hypermedia resource from an API (Application Program Interface) server. A second hypermedia resource related to the first hypermedia resource may be identified. A probability that the second hypermedia resource may be requested may be calculated and a determination based in part on the probability that the second hypermedia resource will be requested may be made. Thereafter, an API request for the first hypermedia resource that includes hint data that identifies the second hypermedia resource may be generated.

20 Claims, 14 Drawing Sheets

US 10,536,390 B1

REQUESTING EMBEDDED HYPERMEDIA RESOURCES IN DATA INTERCHANGE FORMAT DOCUMENTS

BACKGROUND

Hypermedia APIs (Application Program Interfaces) may be configured to use a hypermedia specification that provides a common framework for communicating with hypermedia APIs. For example, a hypermedia API may be designed to use the Hypertext Application Language (HAL) specification. HAL provides conventions for expressing hyperlinks in HAL documents formatted using a data-interchange format, such as JSON (JavaScript Object Notation) or XML (eXtensible Markup Language). HAL may be used to define concepts for resources and links. A resource may be defined using a resource tag and a link may be defined using a resource tag. Illustratively, a resource tag may represent a HTTP (Hypertext Transfer Protocol) resource. A link tag may represent a generic hypermedia control, which can be configured to trigger a HTTP request. For example, a link tag can be configured to trigger a GET request, a POST request, or a PUT request.

A link tag may include a target URI (Uniform Resource Identifier) and a link relation. A link relation may identify a link and the link relation may inform client developers about what resources are available via an API and how the resources can be interacted with. A link relation may be a URL (Uniform Resource Locator) that provides documentation for a given link and provides developers with "discoverability" of resources available through the API. Also, link relations may be used to identify links and embedded resources within a representation, infer a structure and meaning of a target resource, and indicate which requests and representation that can be submitted to a target resource.

DETAILED DESCRIPTION

Figure 1:
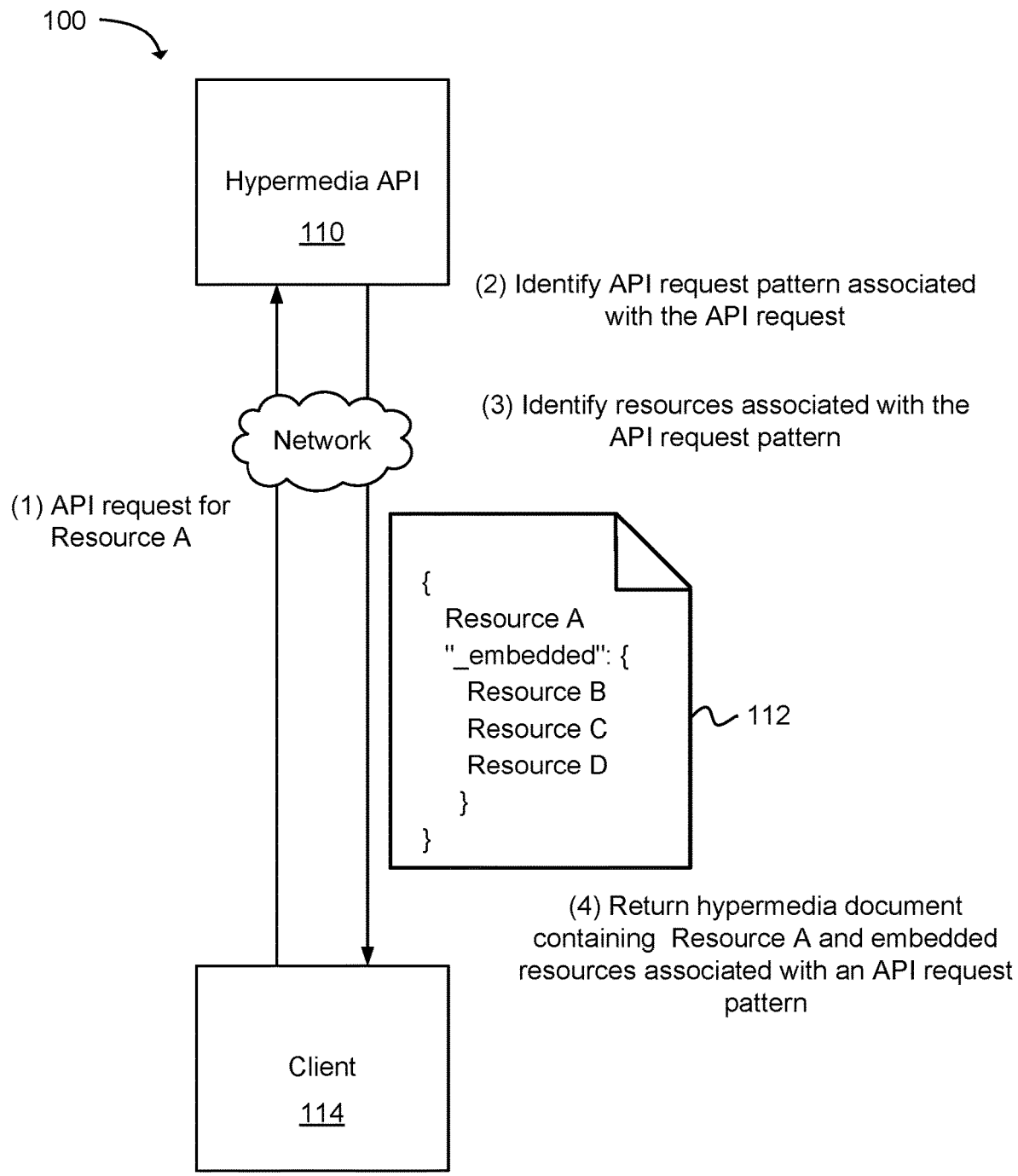
FIG. 1 is a diagram illustrating an example method and system for embedding hypermedia resources in a data interchange format document in anticipation that a client may need the hypermedia resources.

A technology is described for predictively embedding hypermedia resources in data interchange format documents. In one example, a hypermedia resource may be embedded in a data interchange format document based in part on an expectation or a prediction that the hypermedia resource may be requested by a client in a subsequent API request. In another example, a hypermedia resource may be embedded in a data interchange format document in response to an API request from a client that includes a hint for the hypermedia resource. Illustratively, a hypermedia resource may include text, numeric data, metadata, hyperlinks, graphics, audio, as well as other types of hypermedia.

In one example, data associated with API requests for hypermedia resources may be collected and the data may be analyzed to identify API request patterns for hypermedia resources. An API request pattern may include a series of API requests for related hypermedia resources. The API request pattern may define a data flow of hypermedia resources requested by clients. The data flow of hypermedia resources may be used to anticipate which hypermedia resources may be requested by a client. Accordingly, API request pattern analysis may be used to identify hypermedia resources that may be requested by a client in a subsequent API request and the hypermedia resources may be embedded in a data interchange format document returned to the client.

In one example, an API request pattern associated with an API request may be identified by correlating one or more characteristics of the API request to characteristics of the API request pattern. Hypermedia resources associated with the API request pattern may be identified, and a data interchange format document may be generated to include both a hypermedia resource requested by a client and the hypermedia resources associated with the API request. More specifically, the hypermedia resources associated with the API request pattern may be embedded in the data interchange format document. The data interchange format document may be returned to the client associated with the API request. The client may be configured to evaluate the data interchange format document to determine whether the data interchange format document includes embedded hypermedia resources. The client may cache the embedded hypermedia resources and retrieve the hypermedia resources from the cache in the event that the hypermedia resources may be needed, thereby avoiding subsequent API requests for the hypermedia resources.

In another example, an API request for a hypermedia resource received from a client may include hint data for one or more related hypermedia resources. For example, in addition to a request for a first hypermedia resource, an API request may include hint data for a second hypermedia resource that may be related to the first hypermedia resource. The hint data may provide an API server with notice that a hypermedia resource may be requested by the client in a later API request. In receiving an API request that includes hint data, an API server may be configured to decide whether to embed a hypermedia resource identified by the hint data in a data interchange format document to be returned to the client, ignore the hint and wait for a subsequent API request for the hypermedia resource from the client, or instruct the client to request the hypermedia resource at a scheduled time. A determination whether to include the related hypermedia resource may be based in part on various factors such as, but not limited to, a request load on the API server or an amount of time needed to embed the related hypermedia resource in a data interchange format document. Hint data may also be used to provide the API server with information about an API request pattern, provide the API server with information about a number of API requests that the client plans to make, or provide metadata about the client (e.g., client type, location, state, application type, etc.).

To further describe the present technology, examples are now provided with reference to the figures. FIG. 1 illustrates a high level example of a system 100 for embedding hypermedia resources in a data interchange format document (e.g., a hypermedia document 112) in anticipation that a client 114 may request the hypermedia resources at a later time. In the example illustrated, a hypermedia API 110 may receive an API request for a hypermedia resource. The hypermedia API 110 may be configured to use a hypermedia specification, such as, but not limited to: Hypertext Application Language (HAL), JSON-LD (JavaScript Object Notation for Linked Documents), Collection+JSON), SIREN (Structured Interface for Representing Entities), and Atom. HAL is an Internet Draft standard convention for defining hypermedia such as links to external resources within JSON or XML. HAL may be used to create HAL documents, which may be data interchange format documents (e.g., JSON or XML documents) that contain hypermedia resources and links. JSON-LD is a hypermedia specification for encoding Linked Data using JSON. JSON-LD can be used to transform existing JSON to JSON-LD, allowing data to be serialized in a way that is similar to traditional JSON. Collection+JSON is a JSON based read/write hypermedia specification designed to support management and querying of simple collections. Collection+JSON defines both the format and the semantics in a single media type, and also includes support for Query Templates and expanded write support through the use of a Write Template. SIREN is a hypermedia specification used to represent generic entities along with actions for modifying the entities and links for client navigation. Atom is an XML-based document format that describes lists of related information known as "feeds". Feeds are composed of a number of items, called "entries", each with an extensible set of attached metadata. As will be appreciated, the hypermedia API 110 may be configured to use specifications, conventions, or protocols other than those described above to create data interchange format documents that contain embedded hypermedia resources.

An API request may be received from a client 114. A client 114 may include a client device, a client application, or a computer process. As part of receiving the API request, a determination whether the API request may be associated with an API request pattern may be made. An API request pattern, in one example, may include a plurality of successive API requests for hypermedia resources. As an example, an API request pattern may include requests for hypermedia resources included in a data schema. A data schema may provide a data framework that associates related hypermedia resources. As a specific example, an API request pattern may include a series of API requests for hypermedia resources for an industrial stock price index, a technology stock price index, a small cap stock price index, and a large cap stock price index.

In determining whether the API request may be associated with an API request pattern, API request characteristics may be used to identify an API request pattern having characteristics that correspond to the API request characteristics. As one example, a series of API requests received from a client 114 may be tracked to determine whether the series of API requests correspond to an API request pattern. As a specific illustration, the series of API requests being tracked may include a first API request for hypermedia resources associated with an industrial stock price index and a second API request for a hypermedia resource associated with a technology stock price index. After receiving the second API request, the series of API requests (i.e., the first API request and the second API request) may be analyzed to determine whether the series of API requests correspond to an API request pattern.

In the case that a determination is made that the API request is associated with an API request pattern, hypermedia resources associated with the API request pattern may be identified and embedded in a hypermedia document 112 that includes the hypermedia resource requested by the client 114. As a specific illustration based on the illustrations above, a determination may be made that the API request is related to an API request pattern associated with stock index price information. Thus, in response to the API request, a hypermedia document 112 may be generated to include a hypermedia resource requested by the client, and hypermedia resources for stock index price information associated with the API pattern may be embedded in the hypermedia document 112. In one example, the reserved "_embedded" property of the Hypertext Application Language may be used to embed hypermedia resources in hypermedia documents 112.

A hypermedia document 112 that includes the embedded hypermedia resources may be returned to the client 114 in response to the API request, and the client 114 may cache the hypermedia resources, thereby making the hypermedia resources available to the client 114 in the event that the client 114 later needs the hypermedia resources. Illustratively, the cached hypermedia resources may be cached for a defined period of time (e.g., a few seconds or minutes), after which the hypermedia resources may be removed from a cache by the client 114. By providing the client 114 with embedded hypermedia resources, subsequent API requests from the client 114 for the hypermedia resources may be avoided.

Figure 2:
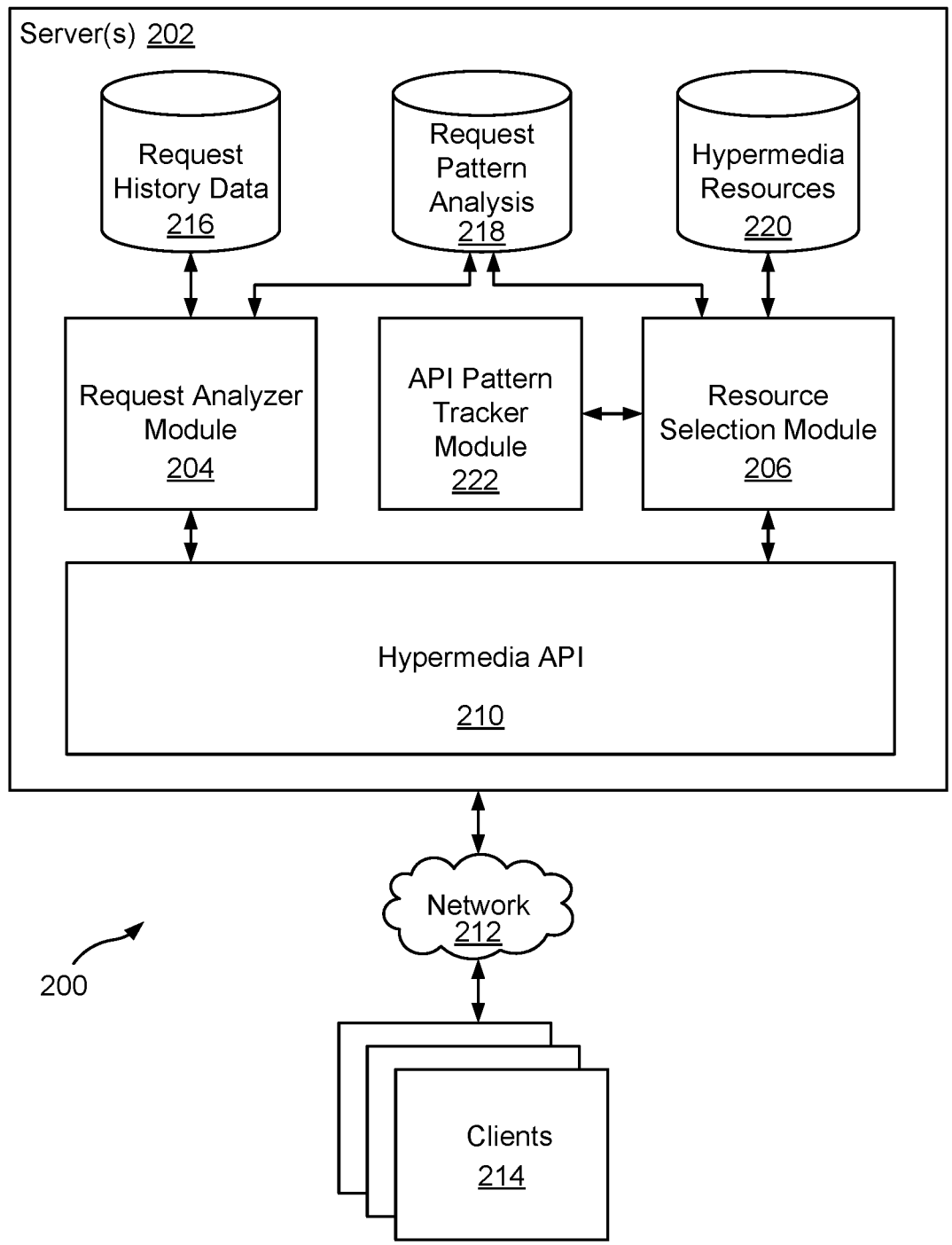
FIG. 2 is a block diagram that illustrates various example components included in a system for embedding hypermedia resources in a data interchange format document.

FIG. 2 illustrates components of an example system 200 on which the present technology may be executed. The system 200 may include a server 202 in communication with one or more clients 214 via a network 212. In one example, the server 202 may be included in a computing service environment having computing resources for executing computing instances (e.g., virtual machines), as described later in association with FIG. 6, or the server 202 may be located in a customer data center on a customer's premises.

As illustrated, the server 202 may be configured to host a hypermedia API 210 accessible to the clients 214. The server 202 may be configured to receive API requests from the clients 214. API requests received from the clients 214 may be for hypermedia resources 220. In response to receiving an API request for a hypermedia resource 220, the hypermedia API 210 may be configured to cause a hypermedia document (e.g., data interchange format document) to be generated. Hypermedia documents may contain a hypermedia resource 220 requested by a client 214 and one or more embedded hypermedia resources 220 related to the requested hypermedia resource based in part on an expectation that the client 214 may need the embedded hypermedia resources at a later time as explained below.

In addition to hosting the hypermedia API 210, the server 202 may include a request analyzer module 204, an API pattern tracker module 222, and a resource selection module 206. The request analyzer module 204 may be configured to analyze an API request to determine whether to embed hypermedia resources 220 in a hypermedia document returned to a client 214. The request analyzer module 204 may be configured to analyze data associated with a plurality of API requests to identify patterns of API requests for hypermedia resources. In one example, request history data 216 associated with API requests for hypermedia resources may be collected and the request analyzer module 204 may be used to analyze the request history data 216 for API request patterns. The request history data 216 may be analyzed to identify successive API requests for hypermedia resources 220. The successive API requests may define an API request pattern.

In one example, an API request pattern may be characterized by a data flow of API requests for related hypermedia resources included in a data schema. As a specific example, an API request pattern may be characterized by a request for a company directory page and follow up requests for a company department page, a department manager page, and a manager contact page. In another example, an API request pattern may be characterized by a succession of API request for hypermedia resources from a particular client 214. As a specific example, a client 214 may periodically make requests for business financial information, where a first request is for a balance sheet report, a second request is for an income statement report, and a third request is for a cash flow report. Other characteristics and classifications that may be used to identify API request patterns may include, but are not limited to: client information (e.g., geographic location, agent software version, client type, etc.), time of API request, timing of API requests, identification of services that pass an API request to the hypermedia API 210, network bandwidth, as well as other characteristics and classifications not specifically mentioned herein. As will be appreciated, any classification or attribute that may identify an API request pattern may be used by the request analyzer module 204 to analyze request history data 216 for API request patterns that substantially correspond with a classification and/or attribute.

The request analyzer module 204 may be configured to generate request pattern analysis 218 which may be used to correlate API requests received at the hypermedia API 210 with API request patterns. Request pattern analysis 218 for an API request pattern may, in one example, include characteristics of the API request pattern used to correlate API requests for hypermedia resources to the API request pattern. The request pattern analysis 218 may also identify hypermedia resources 220 associated with the API request pattern.

Accordingly, request history data 216 may be analyzed to identify an API request pattern using one or more characteristics or classifications as described above. In one example, request history data 216 may be analyzed to determine a depth into a data schema for hypermedia resources 220 that a series of API requests traverses. The depth may be used to determine what hypermedia resources to embed in a hypermedia document to be provided to a client 214. In one example, because characteristics for API request patterns may be similar, except for a depth of traversal into a data schema, a data schema depth for an API request pattern may be determined on a per client 214 basis using request history data 216, or a data schema depth may be determined by calculating an average, mean, or median depth for an API request pattern, and the data schema depth may be used in determining what hypermedia resources 220 to embed in hypermedia documents to be provided to clients 214. Data schema depth may be included in request pattern analysis 218. For example, a record for an API request pattern may include a data schema depth.

In another example, request history data 216 may be analyzed to determine a client purpose for making API requests that comprise an API request pattern. A client purpose (e.g., a tag or metadata representing the client purpose) may be associated with one or more hypermedia resources 220 that may be ultimately requested by a client 214. The client purpose may be used to identify hypermedia resources 220 that may be needed by a client in the future, and although an API request pattern may be defined by a series of API requests for hypermedia resources 220, the series of API requests may not be the same for each client 214. Therefore, determining a client purpose may normalize an API request pattern among a plurality of clients 214. As an illustration, a first client and a second client may share the same goal of obtaining particular information from the hypermedia API 210. The first client may make a series of API requests that result in obtaining the information. The second client may make a different series of API requests that result in obtaining the same information, even though some of the API requests made by the second client may have been different than the API requests made by the first client. Accordingly, a client purpose shared by the clients may be identified and the client purpose may be used to predictively provide the information (i.e., hypermedia resource(s)) to clients having the client purpose by embedding the information (i.e., hypermedia resource(s)) in hypermedia documents provided to the clients.

Request pattern analysis 218 may be stored to a record that may be accessible to the resource selection module 206. A record may be generated to include characteristics associated with an API request pattern and references to hypermedia resources 220 associated with the API request pattern. As an illustration, a record may include characteristics of a data flow of API requests for hypermedia resources 220 and references to the hypermedia resources 220. In some examples, instead of a reference to a hypermedia resource 220, a record may contain the hypermedia resources (e.g., text or data). As such, the hypermedia resources 220 contained in the record may be retrieved directly from the record.

The request analyzer module 204 may be configured to monitor API requests associated with API request patterns to detect changes that may occur in the API request patterns. For example, a data flow of API requests for hypermedia resources may change over time, or a time of day associated with an API request pattern may change. In detecting a change in an API request pattern, a record associated with the API request pattern may be updated to incorporate the changes. In some examples, a change detected in an API request pattern may be monitored for a period of time to determine whether the change is temporary. In the case that a determination is made that the change in the API request pattern is not temporary, a record associated with the API request pattern may be updated to reflect the change. By monitoring API requests for changes in API request patterns, a feedback loop may be used to update API request pattern information on an ongoing basis so that hypermedia resources 220 embedded in hypermedia documents may be relevant to clients 214 that receive the embedded hypermedia resources.

The resource selection module 206 may be configured to select one or more hypermedia resources 220 requested by a client 214 via an API request and generate a hypermedia document that includes the requested hypermedia resources 220. In addition, the resource selection module 206 may be configured to select and embed additional hypermedia resources 220 in a hypermedia document if an API request corresponds to request pattern analysis 218. In one example, API requests may be tracked to determine whether an association to request pattern analysis exists.

The API pattern tracker module 222 may be configured to track a progression of API requests or a series of related API requests sent by clients 214 to the server 202. A set of API requests tracked using the API pattern tracker module 222 may be compared to request pattern analysis 218 to determine whether an association between the set of API request and the request pattern analysis 218 exists. In one example, API requests may be tracked based on requested hypermedia resources. In another example, API requests may be tracked using characteristics of the API requests. For example, a series of API requests may be tracked based on client characteristics (e.g., client identifier, geographic location, etc.), hypermedia resource characteristics (e.g., data schema relationships, hypermedia resource type, etc.), and timing between API requests.

In one example, a threshold may be used to determine a point at which a set of API requests may be compared to request pattern analysis 218. The threshold may allow a sufficient set of API requests to be accumulated that allows a comparison of the set of API requests to the request pattern analysis 218. A threshold may comprise a number of API requests for related hypermedia resources 220 having characteristics that correspond to request pattern analysis 218. In one example, a request threshold may be defined by a number of API requests (e.g., 2, 3, 5, or more) for hypermedia resources 220 received from a client 214 within a defined time period (e.g., within a few seconds). After the defined time period for a threshold expires, tracking of API requests associated with the threshold may be reset. In another example, a child node in a request pattern tree (i.e., tree data structure representing an API request pattern) may be designated as a threshold that if met, allows for hypermedia resources 220 represented by subsequent child nodes in the request pattern tree to be embedded in a hypermedia document. API requests may be tracked to determine whether a flow of the API requests track a data flow of the request pattern tree. In the event that the tracked API requests reach the threshold child node, a threshold flag may be set, indicating to the resource selection module 206 that the threshold has been met.

After a threshold has been met, the resource selection module 206 may be used to select one or more hypermedia resources 220 to embed in a hypermedia document in response to an API request received at the hypermedia API 210. The resource selection module 206 may be configured to identify characteristics associated with a set of API requests and correlate the characteristics with request pattern analysis 218 generated by the request analyzer module 204, as described above. For example, API request characteristics (e.g., requested hypermedia resource(s), client information, time API request received, etc.) may be correlated to request pattern analysis 218 and hypermedia resources associated with the request pattern analysis 218 may be identified and the hypermedia resources 220 may be embedded in a hypermedia document.

In one example, the request pattern analysis 218 may include records associated with known API request patterns. The resource selection module 206 may query the records to determine whether a record contains characteristics that are similar to characteristics of an API request set. In some cases, characteristics of a single API request may be enough to correlate the API request with a record for request pattern analysis 218. For example, analysis may indicate that a series of API requests made by a particular client 214 (e.g., an IoT (Internet of Things) device) are similar each time. As such, the client 214 may be provided a hypermedia document with embedded hypermedia resources 220 in response to a first API request, in lieu of tracking API requests from the client 214 prior to providing the client 214 with embedded hypermedia resources 220.

Request pattern analysis 218 may specify one or more hypermedia resources 220 that are associated with a known API request pattern. For example, a record for request pattern analysis 218 may include references (e.g., a data store location) to hypermedia resources 220 associated with an API request pattern. In some cases, a record may include one or more hypermedia resource 220, as opposed to including a reference to the hypermedia resources 220.

The resource selection module 206 may be configured to generate a hypermedia document that includes hypermedia resources 220 associated with request pattern analysis 218. The hypermedia resources 220 may be embedded using the reserved "_embedded" property of the Hypertext Application Language. A record for request pattern analysis 218 specifying hypermedia resources 220 associated with an API request pattern may be retrieved and a hypermedia document may be generated to include requested hypermedia resources and embedded hypermedia resources specified in the record. Hypermedia documents that include embedded hypermedia resources 220 may be constructed to include metadata for the embedded hypermedia resources. The metadata may be used by a client 214 to identify the hypermedia resources embedded in a hypermedia document.

In one example, hypermedia resources 220 that are to be embedded in a hypermedia document may be dynamically selected. For example, hypermedia resources 220 may be selected based in part on characteristics of an API request, client behavior, client conditions, server 202 conditions, as well as other factors. As an illustration, a number of hypermedia resources to embed in a hypermedia document may be identified, in part, using a frequency of API requests received from a client 214, a workload of a client 214 expressed in an API request, or available network capacity for a client 214 to receive hypermedia documents. As one example, an API request from a client 214 may include hint data (as described later) that may be used to dynamically select hypermedia resources 220. As another example, server 202 conditions (e.g., a server processing capacity) may cause fewer or more hypermedia resources 220 to be embedded in a hypermedia document that is to be returned to a client 214.

In another example, dynamic selection of hypermedia resources 220 for embedding in hypermedia documents may include identifying alternative hypermedia resources that may be associated with an alternative branch of an API request pattern. For example, request pattern analysis 218 may specify a set of hypermedia resources 220 that are associated with an API request pattern. In addition to embedding the set of hypermedia resources in a hypermedia document, an alternative branch of the API request pattern may be identified and hypermedia resources 220 included in the alternative branch may be embedded in the hypermedia document. As a specific example, an API request pattern may include hypermedia resources 220 for domestic stock price indexes. In addition to embedding the domestic stock price indexes in a hypermedia document, an alternative branch of the API request pattern may be identified that includes hypermedia resources 220 for foreign stock price indexes and the hypermedia resources 220 may be embedded in the hypermedia document.

In some examples, machine learning may be used to dynamically identify hypermedia resources 220 to embed in hypermedia documents. As one example, a machine learning model may be used to select hypermedia resources 220 to embed in hypermedia documents using characteristics of API requests received from clients 214. The machine learning model may classify API requests using the characteristics of the API requests and identify request pattern analysis 218 that corresponds to the API request classifications. Hypermedia resources 220 associated with the request pattern analysis 218 may be embedded in hypermedia documents provided to clients 214. Illustratively, machine learning models may include, but are not limited to: logistic regression models, random forest models, decision trees models, Bayesian models, naive Bayes models, probabilistic graphical models, as well as other machine learning models not specifically mentioned here.

The various processes and/or other functionality contained within the system 200 may be executed on one or more processors that are in communication with one or more memory modules. The system 200 may include a number of computing devices that are arranged, for example, in one or more server banks or computer banks or other arrangements. The computing devices may support a computing environment using hypervisors, virtual machine monitors (VMMs) and other virtualization software.

Hypermedia resources 220, request history data 216, and request pattern analysis 218 may be stored using data stores. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the system 200 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 212 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules.

Figure 3:
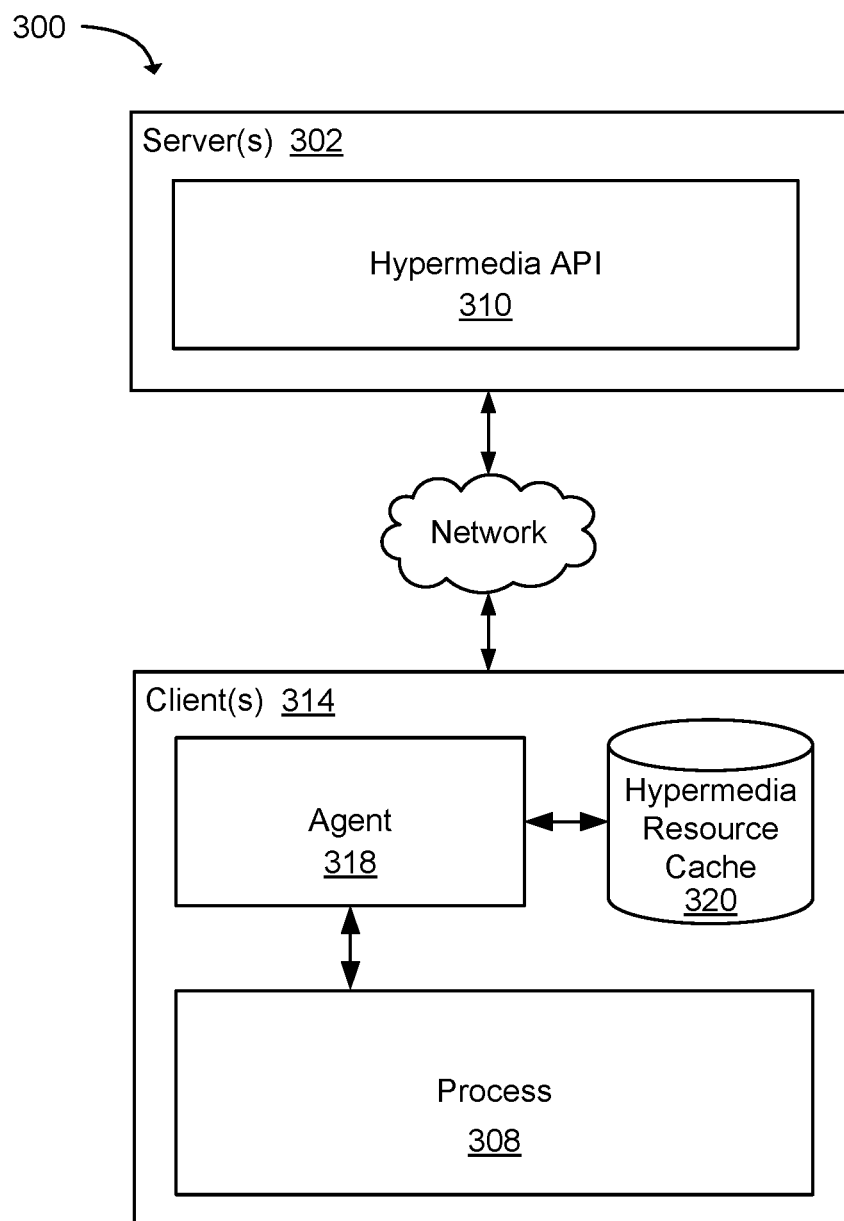
FIG. 3 is a block diagram illustrating an example system for processing a data interchange format document that includes embedded hypermedia resources.

FIG. 3 is a block diagram that illustrates an example system 300 for processing a hypermedia document that includes embedded hypermedia resources. The system 300 may include a client 314 in communication with a server 302 configured to host a hypermedia API 310. The hypermedia API 310 may be configured to provide hypermedia documents in response to API requests, as described earlier.

The client 314 may host an agent 318 configured to handle API requests for hypermedia resources made by a process 308 executing on the client 314. The process 308 may be an instance of a computer program (e.g., an application, script, etc.). In response to an API request made to the hypermedia API 310, the agent 318 may be provided with a hypermedia document that includes a requested hypermedia resource and one or more embedded resources. The agent 318 may be configured to evaluate the hypermedia document for embedded hypermedia resources. For example, the agent 318 may be configured to parse a hypermedia document for a requested resource and links, as well as parse the hypermedia document for embedded hypermedia resources that were predictively added to the hypermedia document, as described earlier. Metadata included in a hypermedia document may be used by the client 314 to identify hypermedia resources that have been embedded in a hypermedia document.

In the case that an embedded hypermedia resource is included in a hypermedia document, the agent 318 may be configured to cache the hypermedia resource in a hypermedia resource cache 320 (e.g., client memory), thereby making the hypermedia resource available should the hypermedia resource be requested by the process 308. For example, as part of handling an API request for a hypermedia resource, the agent 318 may be configured to check the hypermedia resource cache 320 for the hypermedia resource prior to sending the API request to the hypermedia API 310. As an illustration, in response to a request for a first hypermedia resource, the agent 318 may be provided with a hypermedia document that includes the first hypermedia resource, as well as an embedded second hypermedia resource. The second hypermedia resource may be cached in the hypermedia resource cache 320. Thereafter, the process 308 may request the second hypermedia resource. In response, the agent 318 may be configured to retrieve the second hypermedia resource from the hypermedia resource cache 320 and provide the second hypermedia resource to the process 308.

In some examples, the client 314 may be configured to provide the server 302 with utilization information for hypermedia resources embedded in hypermedia documents. Client utilization information may be used to improve request pattern analysis used to provide the client 314 with the embedded hypermedia resources. Illustratively, client utilization information may include information about embedded hypermedia resources that the client 314 utilized and did not utilize. For example, request pattern analysis for an API request pattern may be modified to remove references to a hypermedia resource not used by the client 314. Client utilization information may be used to improve pattern analysis for a plurality of clients 314, as well as improve pattern analysis for individual clients 314.

A client 314 may include a client device, a client application, or computer process. A client device may be any device capable of sending and receiving data over a network. A client device may comprise, for example a processor-based system such as a computing device. A client device may be a device such as, but not limited to, a desktop computer, laptop or notebook computer, tablet computer, mainframe computer system, handheld computer, workstation, network computer, or other devices with like capability.

Figure 4:
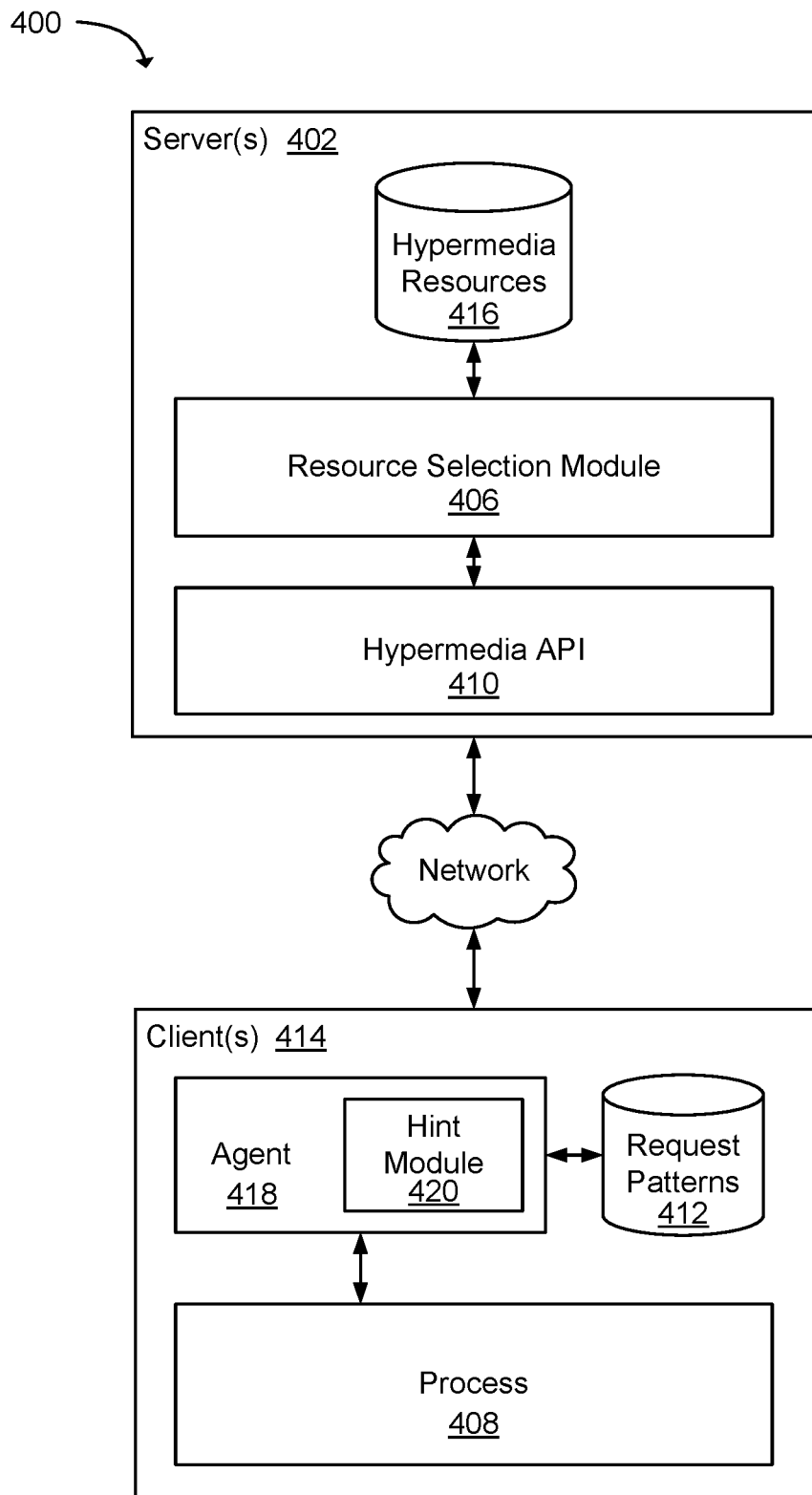
FIG. 4 is a block diagram that illustrates an example system for providing client hints for hypermedia resources to an API.

FIG. 4 is a block diagram illustrating an example system 400 for providing client hints for hypermedia resources in API requests. The system 400 may include one or more clients 414 in communication with a server 402 configured to provide the clients 414 with access to a hypermedia API 410. In the example illustrated, a client 414 may include an agent 418 configured to handle requests for hypermedia resources 416 made by a process 408 (an instance of a computer program) that executes on the client 414. The agent 418 may perform the functions described above in association with FIG. 3. The agent 418 may also include a hint module 420 configured to identify a hypermedia resource 416 related to a hypermedia request that may be subsequently requested by the process 408 and generate a hint for the hypermedia resource 416 which may be included in an API request.

In one example, the agent 418 may receive an instruction from a process 408 executing on the client 414 requesting that the agent 418 send an API request for a hypermedia resource 416 to the server 402. In response to receiving the instruction, the agent 418 may be configured to generate one or more hints for hypermedia resources 416 related to the requested hypermedia resource 416 in the API request. For example, the agent 418 may instruct the hint module 420 to identify one or more hypermedia resources 416 that may be requested by the process 408 in a subsequent request. The hypermedia resources 416 may be identified using request history data. In one example, the request history data may be obtained from a remote server (not shown) configured to maintain the request history data. Request patterns 412 for hypermedia requests may be identified by analyzing the request history data, and current requests for hypermedia resources 416 may be compared to the request patterns 412 to determine whether a correlation exists between a current request and a request pattern 412. In another example, request patterns 412 may be obtained from the remote server which may be configured to analyze the request history data and identify the request patterns 412. A request pattern 412 may include a pattern of requests for hypermedia resources 416 included in a data schema. The data schema may provide a structure of relations between related hypermedia resources 416.

A progression of requests for hypermedia resources 416 made by a process 408, in one example, may be tracked so that the progression of request can be compared to request patterns 412. In comparing a progression of request to a request pattern 412, a determination may be made whether the progression of requests substantially matches the request pattern 412. In one example, requests for hypermedia resources from a process 408 may be tracked based on requested hypermedia resource characteristics. Also, requests from a process 408 may be tracked using characteristics of the requests, such as a process identifier, a time of day, and/or timing between requests.

In one example, a threshold of tracked requests may be used to determine a point at which the tracked requests may be compared to request patterns 412. The tracked requests may be tracked until the threshold has been met. In one example, the threshold may be a number of progressive requests received from a process 408 within a defined time period. In another example, the threshold may be a number requests from a process 408 having common characteristics, such as related hypermedia resources, that are received within a defined time period. Other threshold conditions are also contemplated by the technology. In the event that a defined time period for a threshold expires, tracking of the requests associated with the threshold may be reset.

Tracked requests for hypermedia resources 416 may be compared to request patterns 412 using characteristics of the tracked requests and characteristics of the request patterns 412 to determine whether the tracked requests correspond to one of the request patterns 412. In identifying a request pattern 412 that corresponds to tracked requests, hypermedia resources 416 associated with the request pattern 412 may be identified and hint data for the hypermedia resources 416 may be included in an API request for a hypermedia resource 416 requested by a process 408.

In some examples, after identifying a request pattern 412 associated with tracked requests, a probability that a hypermedia resource 416 associated with the request pattern 412 may be requested in a subsequent request may be calculated. In one example, the probability may be based in part on how closely a flow of hypermedia resource requests for tracked requests correspond to a flow of hypermedia resource requests for a request pattern 412. As an example, a probability (e.g., 75%) that a hypermedia resource for an item F will be requested by a process 408 may be calculated based in part on how closely a tracked request flow of items A, B, C, D corresponds to a request pattern 412 flow of items A, B, C, Y associated with the item F.

In another example, a probability (e.g., 50%) may be based in part on a number of tracked requests that correspond to requests in a request pattern 412. As an example, a probability that a hypermedia resource for an item X will be requested by a process 408 may be calculated based in part on a number of tracked requests for items A, B, C, D that correspond to requests for items A, B, E, G included in a request pattern 412 that includes item X.

In the case that a probability suggests that a process 408 will request a hypermedia resource 416 associated with a request pattern 412, then hint data for one or more hypermedia resources 416 associated with the request pattern 412 may be included in an API request. For example, if the probability is greater than a defined percentage (e.g., 40%, 45%, or 50%), then hint data for the hypermedia resources

416 may be included in the API request. Otherwise, the hint data may not be included in the API request.

As indicated above, an API request for a hypermedia resource 416 requested by a process 408 may be generated that includes hint data for one or more hypermedia resources 416 associated with a request pattern 412. The hint data may provide the hypermedia API 410 with notice that the hypermedia resources 416 may be requested by the client 414 in a later API request. The hint data may include an identifier for the hypermedia resource 416. Also, the hint data may include additional information. As one example, hint data may include a priority indicator for the hypermedia resource 416 used by a resource selection module 406 to determine whether to embed the hypermedia resource 416 in a hypermedia document to be returned to the client 414. As another example, hint data may include an indication for when a hypermedia resource 416 may be needed by a client 414.

In one example, hint data may be included in an API request that identifies a hypermedia resource 416 associated with an alternative branch of a request pattern 412. For example, in addition to hint data for a hypermedia resource 416 that may be requested by a process 408 at a later time, an alternative branch of a request pattern 412 associated with the hypermedia resource 416 may be identified and hint data for an alternative hypermedia resource 416 included in the alternative branch of the request pattern 412 may be included in an API request. As a specific example, a request pattern 412 may include hypermedia resources 416 for eastern Caribbean vacation packages. In addition to including hint data for the eastern Caribbean vacation packages in an API request, an alternative branch of the request pattern 412 may be identified that includes hypermedia resources 416 for western Caribbean vacation packages and the hint data for the hypermedia resources 416 may be included in the API request. In receiving the API request, the resource selection module 406 may identify the alternative hypermedia resource 416 and return a hypermedia document that includes a requested hypermedia resource 416 and the alternative hypermedia resource 416 associated with the alternative branch of the request pattern 412.

In one example, hint data included in an API request may override an API request pattern used by the resource selection module 406 to identify hypermedia resources 416 to embed in a hypermedia document returned to a client 414. For example, in receiving hint data in an API request, the resource selection module 406 may use the hint data to identify a hypermedia resource 416 to embed in a hypermedia document as opposed to using request pattern analysis for an API request pattern as described in association with FIG. 2.

In response to receiving an API request that includes hint data, the hypermedia API 410 may be configured to provide the hint data to the resource selection module 406, which may identify a hypermedia resource 416 associated with the hint data and embed the hypermedia resource 416 in a hypermedia document that may then be returned to the client 414 associated with the API request. In one example, the resource selection module 406 may be configured to make a determination whether to include the hypermedia resource 416 in the hypermedia document, or send the agent 418 an instruction to request the hypermedia resource 416 at a later time, as described below in association with FIG. 5.

In receiving a hypermedia document in response to an API request, the agent 418 may be configured to evaluate the hypermedia document to determine whether the hypermedia document includes a hypermedia resource 416 associated with hint data included in the API request. In determining that the hypermedia document includes the hypermedia resource 416 associated with the hint data, the agent 418 may be configured to cache the hypermedia resource in client memory as described in association with FIG. 3. Accordingly, in the event that the agent 418 receives an instruction from a process 408 to make a request to the hypermedia API 410 for the cached hypermedia resource, the agent may be configured to retrieve the cached hypermedia resource from the client memory.

In another example, the hint module 420 may be configured to generate hint data for a request pattern 412. The request pattern 412 may be provided to the server 402 and the request pattern 412 may be used to proactively embed hypermedia resources 416 associated with the request pattern 412 in hypermedia documents. In another example, the hint module 420 may be configured to provide the server 402 with information about a number of API requests that the process 408 plans to make. In yet another example, the hint module 420 may be configured to provide metadata about the client 414 (e.g., client type) or metadata about the process 408 (e.g., process type).

Figure 5:
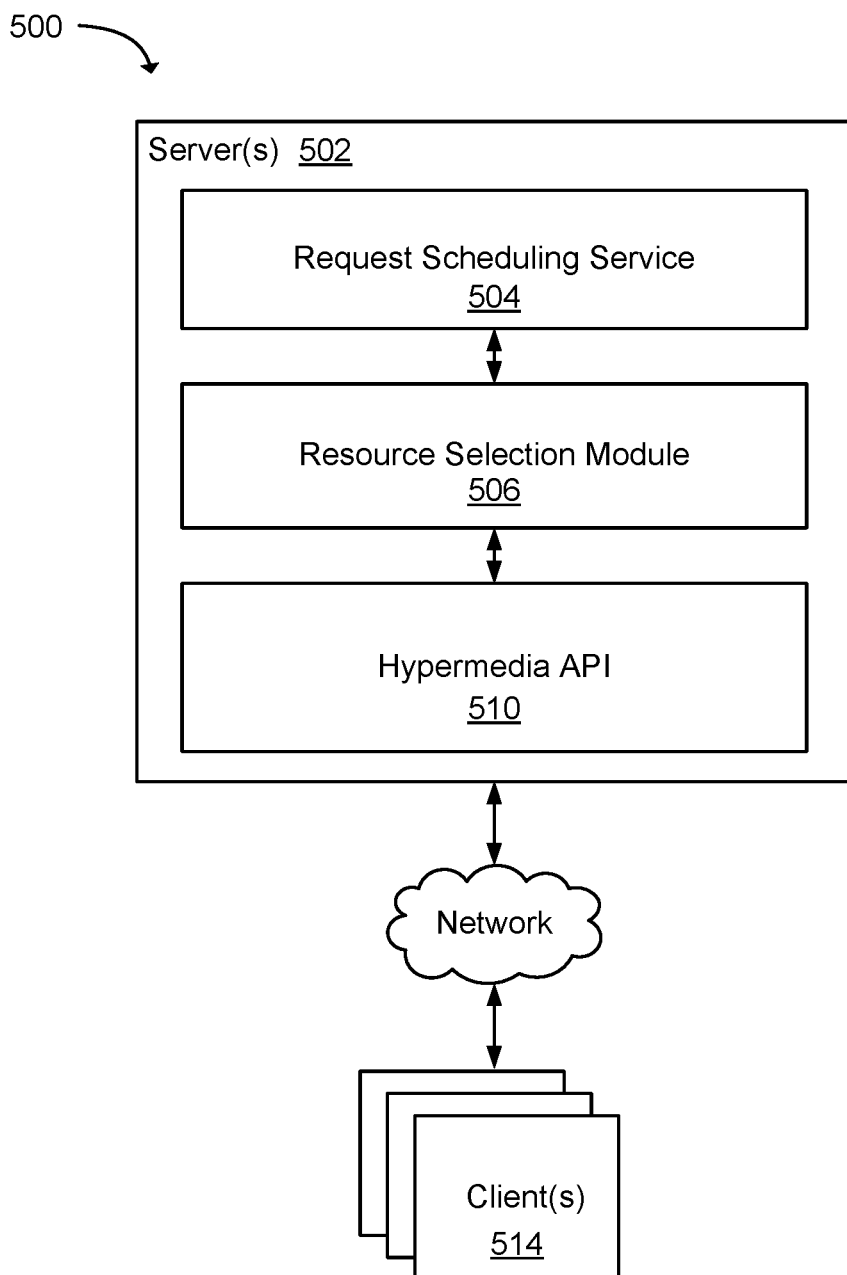
FIG. 5 is a block diagram illustrating an example system for scheduling an API request for a hypermedia resource.

FIG. 5 is a block diagram that illustrates an example system 500 for scheduling an API request for a hypermedia resource for which a client 514 provided hint data in a previous API request. As described above with respect to FIG. 4, a client 514 may include hint data for a hypermedia resource in an API request. In receiving an API request that includes hint data for a hypermedia resource, a resource selection module 506 may be configured to make a determination whether to include the hypermedia resource in a hypermedia document, ignore the hint data, or send the client 514 an instruction to request the hypermedia resource 416 at a later time.

Whether to embed a hinted hypermedia resource in a hypermedia document may be based in part on factors associated with a server 502 that hosts a hypermedia API 510, a server 502 that hosts a hypermedia data store, a network used to transmit hypermedia documents to clients 514, as well as the state of other components included in the system 500. As one example, a current request load on a hypermedia API 510 may be used as a factor in deciding whether to embed a hinted hypermedia resource in a hypermedia document. As another example, an amount of time to prepare a hypermedia document that includes a hinted hypermedia resource may be used as a factor in deciding whether to embed the hinted hypermedia resource in the hypermedia document.

In one example, based on one or more factors, the resource selection module 506 may make a determination to instruct a client 514 to request a hinted hypermedia resource at a later time. In one example, a client 514 may be provided with a scheduled time to make a subsequent API request for a hinted hypermedia resource. The resource selection module 506 may send a request to a request scheduling service 504 for a scheduled time to make a subsequent API request and the scheduled time may be provided to a client 514. In one example, a scheduled time may be based in part on an anticipated request load on a hypermedia API 510. In another example, a scheduled time may be based in part on an estimated time to prepare a hinted hypermedia resource to be provided to a client 514 (e.g., a time to retrieve a hypermedia resource or a time to generate a hypermedia resource). In one example, a scheduled time provided by the request scheduling service 504 may consider network latency factors that affect a time that an API request may be received at the server 502.

In one example, a scheduled time obtained from the request scheduling service 504 may be provided in a hypermedia document returned to a client 514. For example, in response to an API request for a requested hypermedia resource that includes hint data for a hinted hypermedia resource, a hypermedia document returned to a client 514 may include the requested hypermedia resource and a scheduled time to request the hinted hypermedia resource from the hypermedia API 510. In response to receiving the hypermedia document, the client 514 may send a second API request for the hinted hypermedia resource to the hypermedia API 510 at the scheduled time. While FIGS. 2-5 illustrate examples of systems that may implement the techniques described above, many other similar or different environments are possible. The example environments discussed and illustrated above are merely representative and not limiting.

Figure 6:
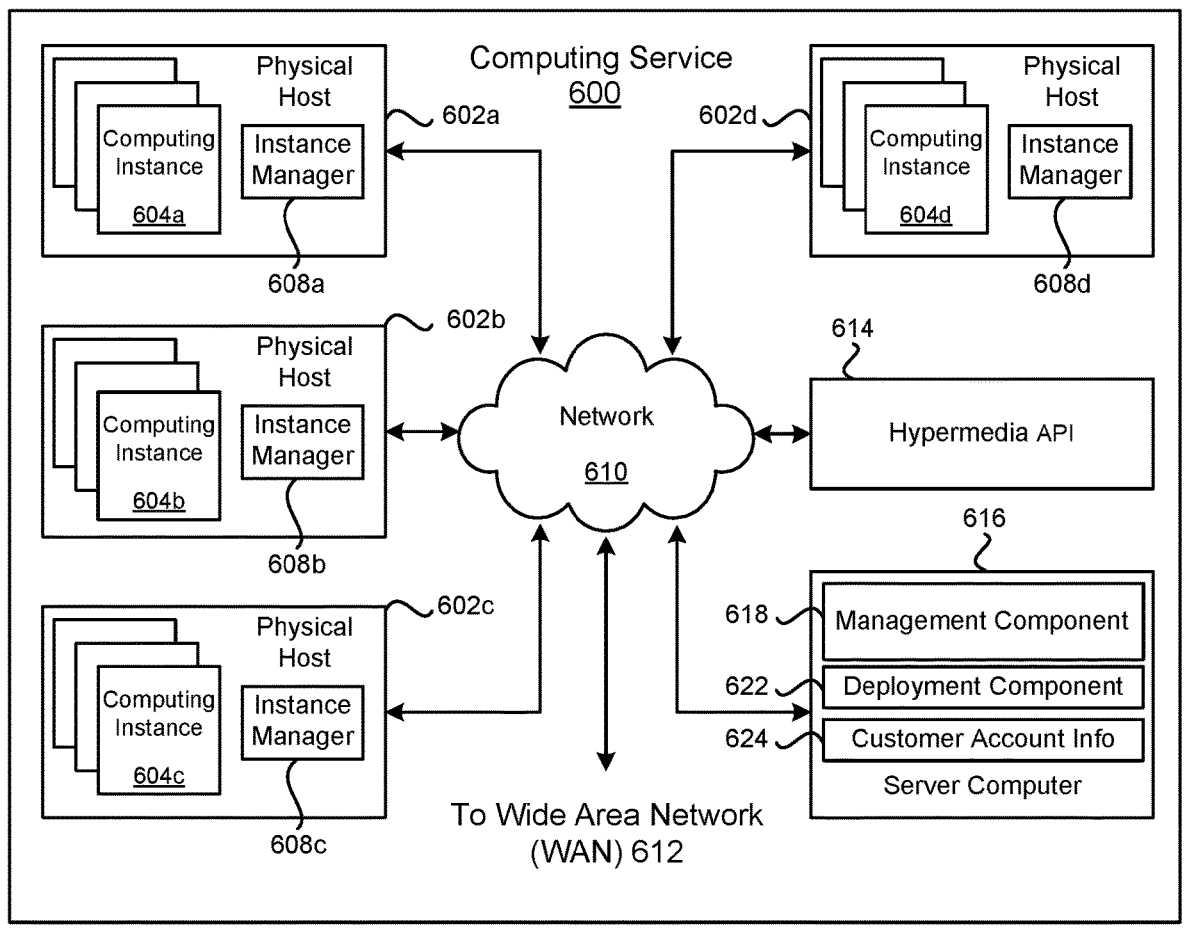
FIG. 6 is a block diagram that illustrates an example computing service environment that includes an API.

FIG. 6 is a block diagram illustrating an example computing service 600 that may be used to execute and manage a plurality of computing instances 604a-d. In particular, the computing service 600 depicted illustrates one environment in which the technology described herein may be used. The computing service 600 may be one type of environment that includes various virtualized service resources that may be used, for instance, to host computing instances 604a-d.

The computing service 600 may be capable of delivery of computing, storage and networking capacity as a software service to a community of end recipients. In one example, the computing service 600 may be established for an organization by or on behalf of the organization. That is, the computing service 600 may offer a "private cloud environment." In another example, the computing service 600 may support a multi-tenant environment, wherein a plurality of customers may operate independently (i.e., a public cloud environment). Generally speaking, the computing service 600 may provide the following models: Infrastructure as a Service ("IaaS"), Platform as a Service ("PaaS"), and/or Software as a Service ("SaaS"). Other models may be provided. For the IaaS model, the computing service 600 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. For example, application developers may develop a hypermedia API and deploy the API on the computing service platform. The SaaS model allows installation and operation of application software in the computing service 600. End customers may access the computing service 600 using networked client devices, such as desktop computers, laptops, tablets, smartphones, etc. running web browsers or other lightweight client applications, for example. Those familiar with the art will recognize that the computing service 600 may be described as a "cloud" environment.

The particularly illustrated computing service 600 may include a plurality of server computers 602a-d. While four server computers are shown, any number may be used, and large data centers may include thousands of server computers. The computing service 600 may provide computing resources for executing computing instances 604a-d. Computing instances 604a-d may, for example, be virtual machines. A virtual machine may be an instance of a software implementation of a machine (i.e. a computer) that executes applications like a physical machine. In the example of a virtual machine, each of the server computers 602a-d may be configured to execute an instance manager 608a-d capable of executing the instances. The instance manager 608a-d may be a hypervisor, virtual machine monitor (VMM), or another type of program configured to enable the execution of multiple computing instances 604a-d on a single server. Additionally, each of the computing instances 604a-d may be configured to execute one or more applications. In the example illustrated, a server computer 614 or API gateway may execute a hypermedia API as described earlier.

One or more server computers 616 may be reserved to execute software components for managing the operation of the computing service 600 and the computing instances 604a-d. For example, the customer may setup computing instances 604a-d and make changes to the configuration of the computing instances 604a-d. A server computer 616 may execute a management component 618. A customer may access the management component 618 to configure various aspects of the operation of the computing instances 604a-d purchased by a customer.

A deployment component 622 may be used to assist customers in the deployment of computing instances 604a-d. The deployment component 622 may have access to account information associated with the computing instances 604a-d, such as the name of an owner of the account, credit card information, country of the owner, etc. The deployment component 622 may receive a configuration from a customer that includes data describing how computing instances 604a-d may be configured. For example, the configuration may include an operating system, provide one or more applications to be installed in computing instances 604a-d, provide scripts and/or other types of code to be executed for configuring computing instances 604a-d, provide cache logic specifying how an application cache should be prepared, and other types of information. The deployment component 622 may utilize the customer-provided configuration and cache logic to configure, prime, and launch computing instances 604a-d. The configuration, cache logic, and other information may be specified by a customer accessing the management component 618 or by providing this information directly to the deployment component 622.

Customer account information 624 may include any desired information associated with a customer of the multi-tenant environment. For example, the customer account information may include a unique identifier for a customer, a customer address, billing information, licensing information, customization parameters for launching instances, scheduling information, etc. As described above, the customer account information 624 may also include security information used in encryption of asynchronous responses to API requests. By "asynchronous" it is meant that the API response may be made at any time after the initial request and with a different network connection.

A network 610 may be utilized to interconnect the computing service 600 and the server computers 602a-d, 616. The network 610 may be a local area network (LAN) and may be connected to a Wide Area Network (WAN) 612 or the Internet, so that end customers may access the computing service 600. The network topology illustrated in FIG. 6 has been simplified, many more networks and networking devices may be utilized to interconnect the various computing systems disclosed herein.

Figure 7:
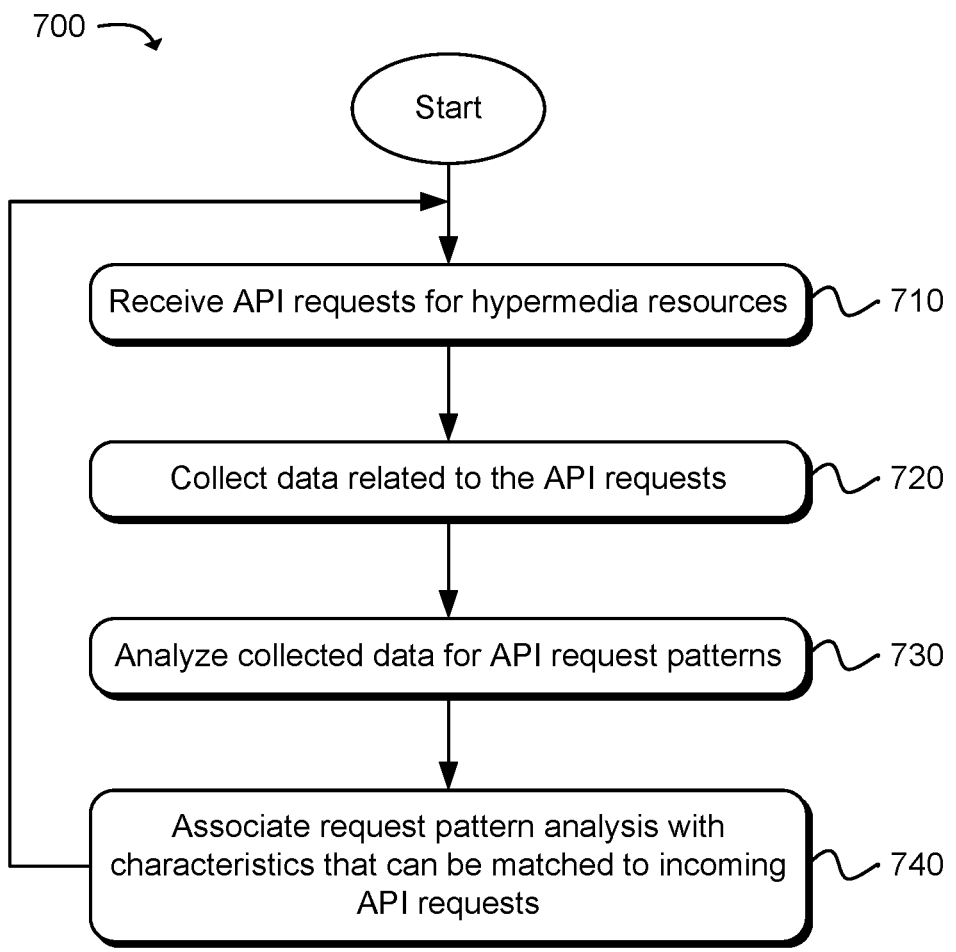
FIG. 7 is a flow diagram that illustrates an example method for analyzing data associated with API requests to identify API request patterns.

Moving now to FIG. 7, a flow diagram illustrates an example method 700 for analyzing data associated with API requests to identify API request patterns. Starting in block 710, an API server(s) may receive API requests for hypermedia from clients as described earlier. As in block 720, data associated with the API requests received at an API server may be collected. The data collected may include information associated with the clients, such as client identifiers, client types, client software version information, client geographic location information, as well as other information for the clients. The data collected may also include information associated with the API requests received at the API server(s). The data may include information about a hypermedia resource requested by a client, a time that the API request was sent and received, timing between related API requests, information about hints for hypermedia resources included in an API request, as well as other information associated with API requests.

As in block 730, the collected data may be analyzed to identify request patterns that may be used to identify hypermedia resources to predictively embed in hypermedia documents provided to the clients. For example, the data may be analyzed to identify API request patterns associated with particular hypermedia resources, and/or identify API request patterns associated with particular clients, as described in greater detail earlier in association with FIG. 2. Characteristics of the API request patterns may be identified and, as in block 740, the characteristics of the API request patterns may be associated with request pattern analysis. In doing so, the characteristics may be correlated to characteristics of API requests received from clients, and the clients may then be provided with hypermedia resources associated with the request pattern analysis.

Figure 8:
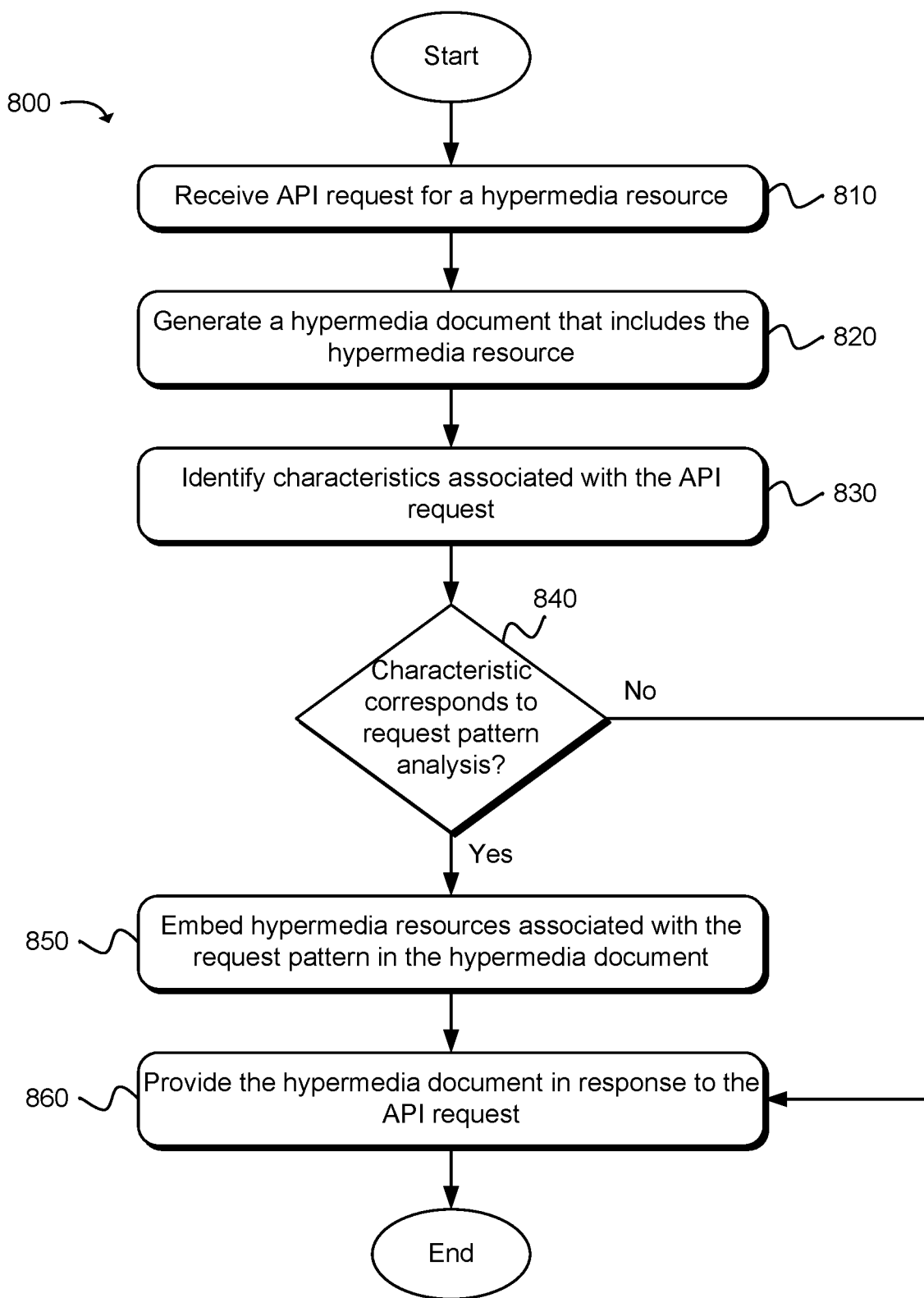
FIG. 8 is a flow diagram that illustrates an example method for embedding hypermedia resources in a data interchange format document in response to an API request from a client.

FIG. 8 is a flow diagram illustrating an example method 800 for embedding hypermedia resources in a hypermedia document in response to an API request from a client. As in block 810, an API server may receive an API request for one or more hypermedia resources. In response to the API request, as in block 820, the API server may generate a hypermedia document that includes the requested hypermedia resource(s). Illustratively, the hypermedia document may include a JSON hypermedia document or a XML hypermedia document. JSON hypermedia may be a standard which establishes conventions for expressing hypermedia controls using JSON. XML hypermedia may be a standard which establishes conventions for expressing hypermedia controls using XML.

As part of handling the API request, characteristics associated with the API request may be identified, as in block 830. Characteristics of the API request may include requested hypermedia resources, client information (e.g., geographic location, software version, client type, etc.), a time of day that the API request was sent or received, as well as other characteristics. As in block 840, the characteristics of the API request may be compared to request pattern analysis for an API request pattern to determine whether the characteristics of the API request correspond to the request pattern analysis. In the case that the characteristics of the API request correspond to the request pattern analysis, hypermedia resources associated with the request pattern analysis may be identified, and as in block 850, the hypermedia resources may be embedded in the hypermedia document generated in block 820. Thereafter, as in block 860, the hypermedia document may be provided to a client in response to the API request.

As an illustration, request pattern analysis may show that when a particular client requests hypermedia resources for a business directory of employees, the client subsequently requests hypermedia resources for a business directory of managers. Therefore, an API request received from the client requesting hypermedia resources for the business directory of employees may be compared to the request pattern analysis. More specifically, the characteristics of the API request (e.g., the requested hypermedia resources and client information) may be correlated to the request pattern analysis that includes similar characteristics. That is, the request pattern analysis includes hypermedia resource characteristics for the business directory of employees and client characteristics of the client. After correlating the API request to the request pattern analysis, hypermedia resources associated with the request pattern analysis (i.e., the hypermedia resources for the business directory of managers) may be identified, and the hypermedia resources may be embedded in a hypermedia document which may then be returned to the client.

Figure 9:
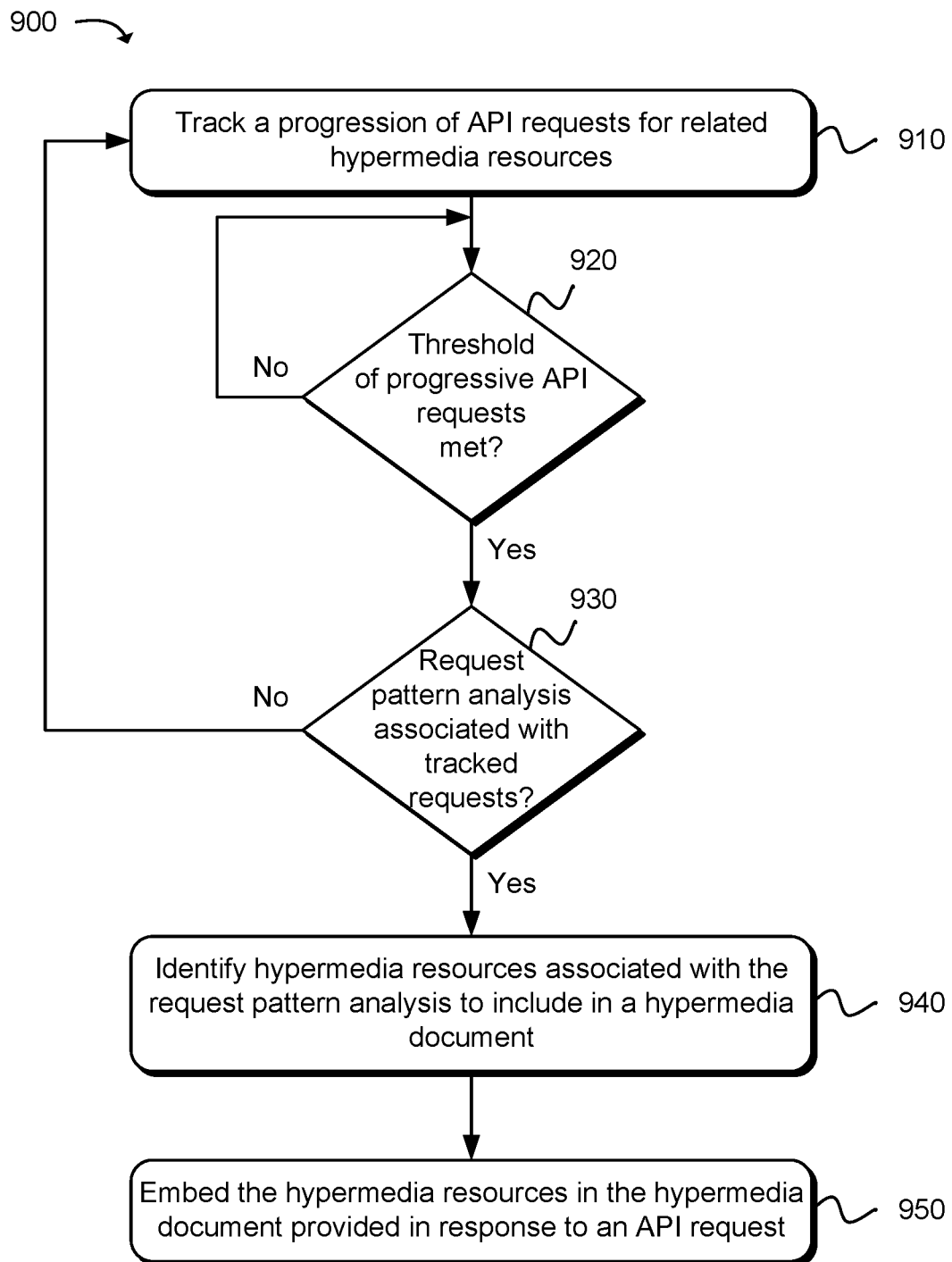
FIG. 9 is a flow diagram illustrating an example method for tracking API requests until a threshold is met and embedding hypermedia resources in data interchange format documents.

FIG. 9 is a flow diagram that illustrates an example method 900 for tracking API requests until a threshold is met and embedding hypermedia resources in hypermedia documents. As in block 910, a progression of API requests for hypermedia resources received from a client of an API server may be tracked. In one example, a client identifier may be used to track API requests. In some examples, in addition to tracking API requests using a client identifier, the API requests may be tracked using a common characteristic associated with the API requests, such as a relationship between hypermedia resources requested in the API requests.

API requests from a client may be tracked until a threshold has been met. In one example, the threshold may be a number of progressive API requests received from a client within a defined time period. In another example, the threshold may be a number API requests from a client having common characteristics, such as related hypermedia resources, that are received within a defined time period. Other threshold conditions may be used as well. A threshold may be used to determine a point at which the tracked API requests may be compared to request pattern analysis associated with API request patterns. In the event that a defined time period for a threshold expires, tracking of the API requests associated with the threshold may be reset.

As in block 920, a determination may be made whether the tracked API requests has met the threshold. In the case that the threshold has been met, then as in block 930, a determination may be made whether the tracked progression of API requests corresponds to request pattern analysis for API request patterns, as described earlier. In the case that the tracked progression of API requests does correspond to request pattern analysis for an API request pattern, then as in block 940, hypermedia resources associated with the request pattern analysis may be identified and, as in block 950, the hypermedia resources may be embedded in a hypermedia document that may be provided to a client in response to the API request.

Figure 10:
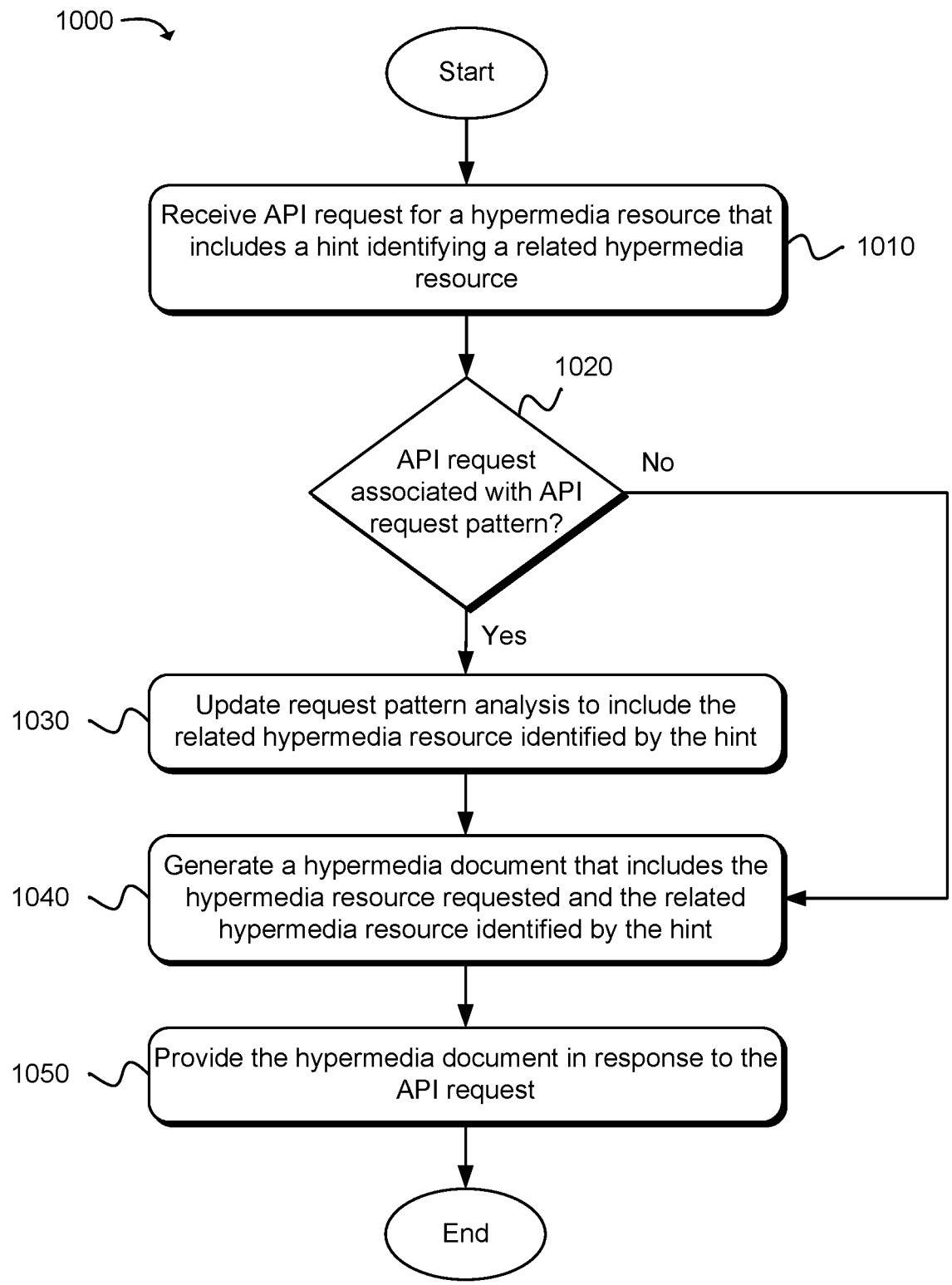
FIG. 10 is a flow diagram that illustrates an example method for providing a hint for a hypermedia resource in an API request.

FIG. 10 is a flow diagram illustrating an example method 1000 for providing a hint for a hypermedia resource in an API request and updating request pattern analysis for an API request pattern to include the hypermedia resource. In one example, an API server may be configured to monitor API requests for hints and update API patterns accordingly. In another example, clients may use hints to override an API request pattern used by the API server to predictively embed hypermedia resources in a hypermedia document. In another example, a client hint for a hypermedia resource may include an explicit instruction for an API server to update an API request pattern to include or exclude the hinted hypermedia resource.

The illustrated method 1000 provides one example of using a hint to update request pattern analysis for an API request pattern. As in block 1010, an API request for a hypermedia resource that includes a hint identifying a related hypermedia resource may be received at an API server. The related hypermedia resource may be related to the requested hypermedia resource by way of a data schema. That is, the requested hypermedia resource and the related hypermedia resource may be included in the same data schema.

In receiving the API request, as in block 1020, a determination may be made whether the API request may be associated with an API request pattern. The determination may be made using the methods described earlier. In the case that the API request is associated with an API request pattern, then as in block 1030, the API request pattern may be updated to include the hinted hypermedia resource. As in block 1040, the API server may generate a hypermedia document that includes the hypermedia resource requested by the API request, hypermedia resources associated with the API request pattern, and the hinted hypermedia resource. As in block 1050, the hypermedia document may be provided to the client in response to the API request.

As an illustration, the API request in block 1010 may request a hypermedia resource for Seattle Wash. real estate listings, and the API request may include a hint for hypermedia resources for Redmond Wash. real estate listings. The API request may be evaluated and a determination may be made that the API request is associated with request pattern analysis that includes hypermedia resources for Bellevue, Kent, and Tacoma Wash. real estate listings. The request pattern analysis may then be updated to include hypermedia resources for Redmond Wash. real estate listings. A hypermedia document may be generated to include hypermedia resources for Seattle Wash. real estate listings, and real estate listings for Bellevue, Kent, Tacoma, and Redmond Wash. may be embedded in the hypermedia document and the hypermedia document may be returned to a client associated with the API request.

Figure 11:
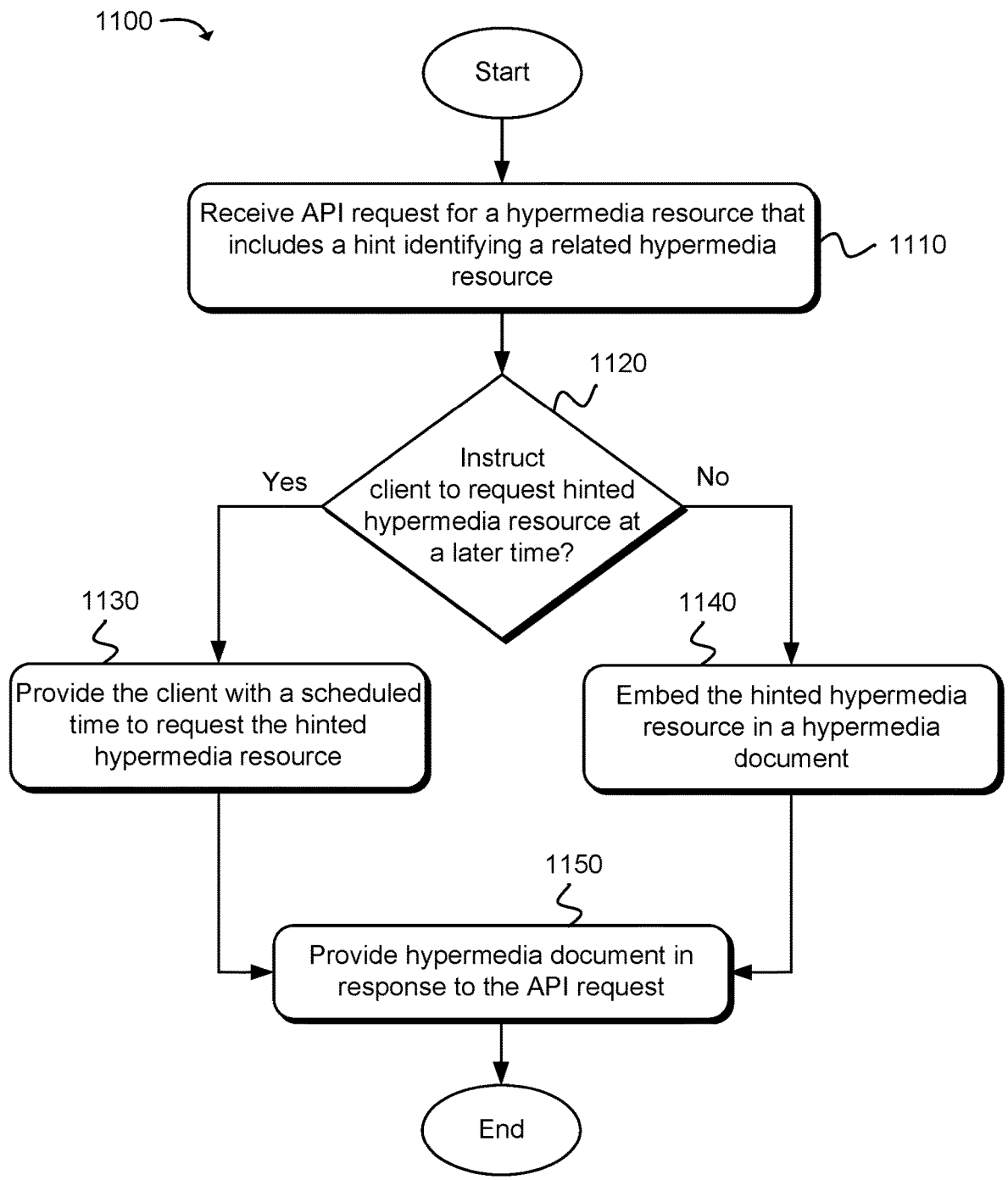
FIG. 11 is a flow diagram illustrating an example method for handling a hint for a hypermedia resource in an API request.

FIG. 11 is a flow diagram that illustrates an example method 1100 for handling a hint for a hypermedia resource in an API request. An API server may be configured to evaluate an API request for hints for hypermedia resources and decide whether to embed hinted hypermedia resources in a hypermedia document. As in block 1110, an API request for a hypermedia resource may be received at the API server. The API request may include a hint for a hypermedia resource related to the requested hypermedia resource.

As in block 1120, a decision whether to embed the hinted hypermedia resource in a hypermedia document or instruct a client to request the hinted hypermedia resource at a later time may be made. The decision may be based on factors associated with retrieving the hinted hypermedia resource, generating the hinted hypermedia resource, and/or transmitting the hinted hypermedia resource to a client, as well as other factors. In the case that a decision to embed the hinted hypermedia resource in a hypermedia document is made, then as in block 1140, the hypermedia document may be generated and, as in block 1150, the hypermedia document may be provided to the client in response to the API request. In the case that a decision to instruct the client to request the hinted hypermedia resource at a later time is made, then as in block 1130, the client may be provided with a scheduled time (e.g., within a few seconds or minutes) to request the hinted hypermedia resource from the API server. The scheduled time may be provided to the client in a hypermedia document that includes the requested hypermedia resource, or the scheduled time may be provided to the client in a separate message sent to the client.

Figure 12:
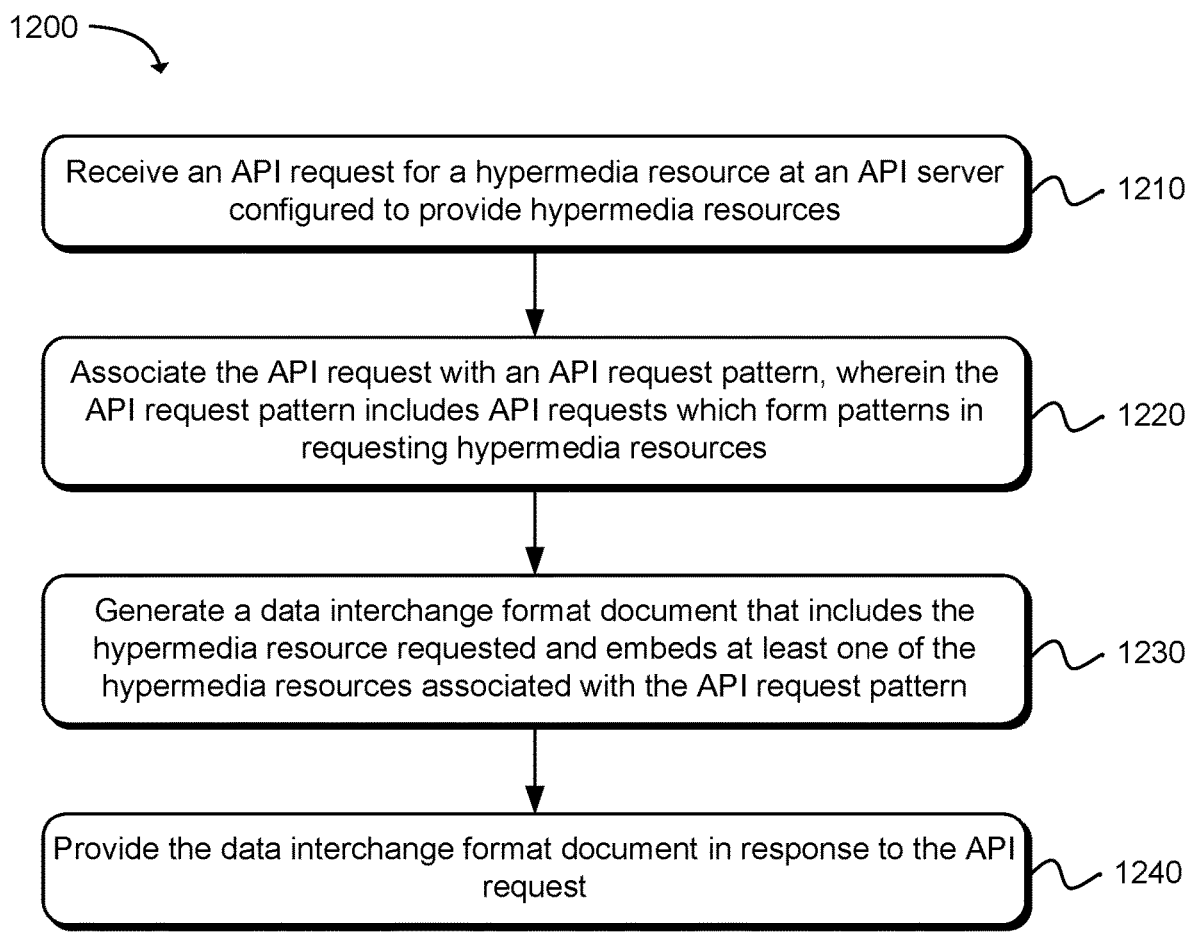
FIG. 12 is a flow diagram that illustrates an example method for embedding hypermedia in data interchange format documents.

FIG. 12 is a flow diagram illustrating an example method 1200 for embedding hypermedia in data interchange format documents. Beginning in block 1210, an API request for a hypermedia resource may be received at an API server configured to provide hypermedia resources. The API server may be configured to return data interchange format documents that include a requested hypermedia resource and embedded hypermedia resources to a client.

As in block 1220, the API request may be associated with an API request pattern, where the API request pattern includes API requests for hypermedia resources. In one example, at least one characteristic associated with the API request may be correlated to at least one characteristic associated with the API request pattern. The at least one characteristic associated with the API request pattern may be a data characteristic indicating a data flow of the hypermedia resources requested from clients, or the at least one characteristic associated with the API request pattern may be a client characteristic indicating a succession of the API requests for the hypermedia resources from the client.

A hypermedia resource associated with the API request pattern may be identified and, as in block 1230, a data interchange format document may be generated to include a hypermedia resource requested by the API request and the hypermedia resource associated with the API request pattern may be embedded in the data interchange format document. Thereafter, as in block 1240, the data interchange format document may be provided in response to the API request. A client associated with the API request for the hypermedia resource may be configured to evaluate the data interchange format document provided by the API server for additional hypermedia resources added to the data interchange format document and cache the additional hypermedia resources in client memory.

Figure 13:
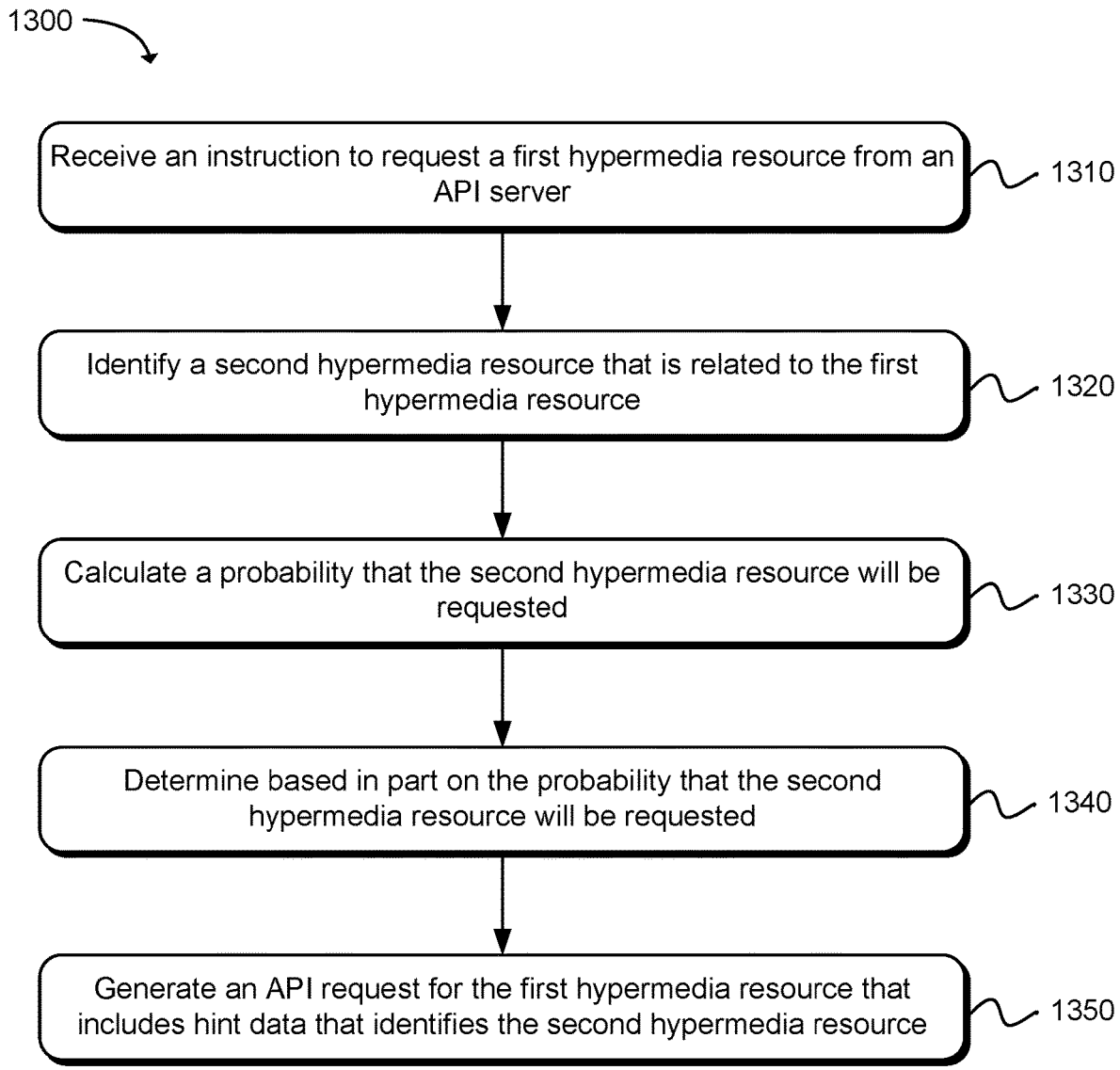
FIG. 13 is a flow diagram illustrating an example method for requesting hypermedia resources from an API server.

FIG. 13 is a flow diagram that illustrates an example method 1300 for requesting hypermedia resources from an API server. Beginning in block 1310, an instruction to request a first hypermedia resource from an API server configured to use data interchange format may be received. In one example, the instruction may be received from an application or process that executes on a client, such as a client device or client program.

As in block 1320, a second hypermedia resource that is related to the first hypermedia resource may be identified. For example, the second hypermedia resource may be identified using a request pattern associated with the first hypermedia resource. In one example, the request pattern may be identified by tracking a progression of client requests for related hypermedia resources and associating the progression of client requests with the request pattern.

As in block 1330, a probability that the second hypermedia resource will be requested may be calculated. In one example, a request pattern may be used to calculate the probability that the second hypermedia resource will be requested as described earlier.

As in block 1340, a determination may be made based in part on the probability that the second hypermedia resource will be requested, and as in block 1350, an API request for the first hypermedia resource that includes hint data that identifies the second hypermedia resource may be generated, and the API request may be sent to the API server.

Figure 14:
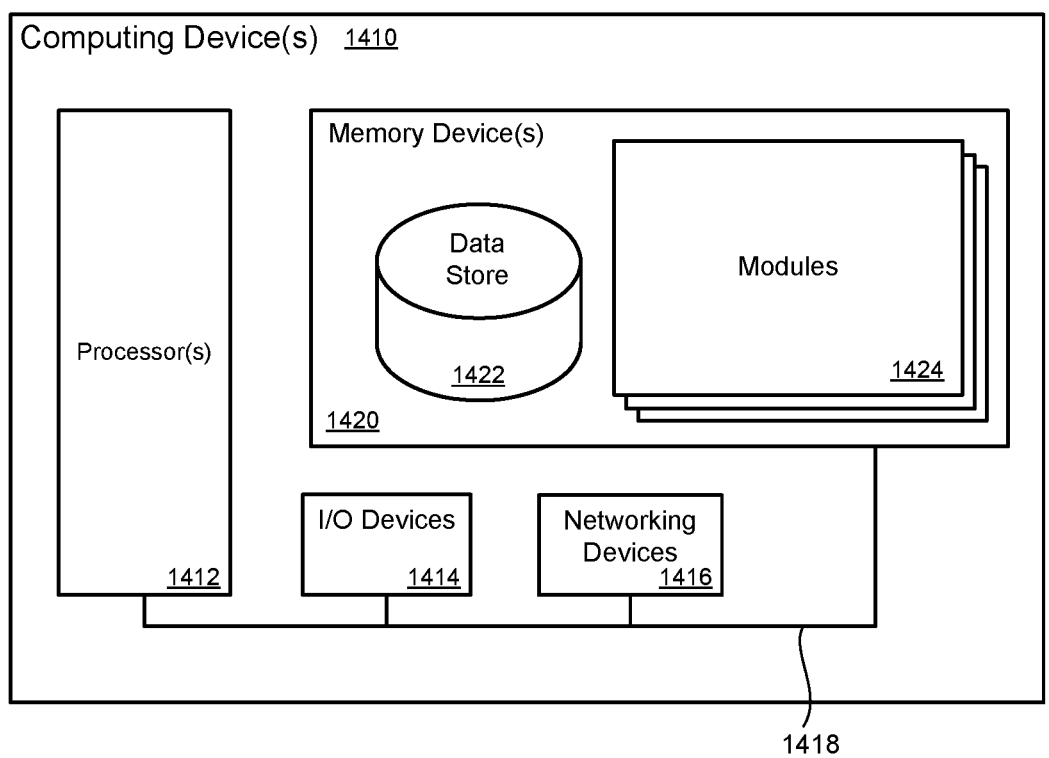
FIG. 14 is block diagram illustrating an example of a computing device that may be used to execute the methods described herein.

FIG. 14 illustrates a computing device 1410 on which modules of this technology may execute. A computing device 1410 is illustrated on which a high level example of the technology may be executed. The computing device

1410 may include one or more processors 1412 that are in communication with memory devices 1420. The computing device 1410 may include a local communication interface 1418 for the components in the computing device. For example, the local communication interface 1418 may be a local data bus and/or any related address or control busses as may be desired.

The memory device 1420 may contain services and modules 1424 that are executable by the processor(s) 1412 and data for the modules 1424. In one example, the memory device 1420 may include an API service, a request analyzer module, an API pattern tracker module, a resource selection module, and other modules. In another example, the memory device 1420 may include an agent module, a hint module, and other modules. The modules 1424 may execute the functions described earlier. A data store 1422 may also be located in the memory device 1420 for storing data related to the modules 1424 and other applications along with an operating system that is executable by the processor(s) 1412.

Other applications may also be stored in the memory device 1420 and may be executable by the processor(s) 1412. Components or modules discussed in this description that may be implemented in the form of software using high programming level languages that are compiled, interpreted or executed using a hybrid of the methods.

The computing device may also have access to I/O (input/output) devices 1414 that are usable by the computing devices. Networking devices 1416 and similar communication devices may be included in the computing device. The networking devices 1416 may be wired or wireless networking devices that connect to the internet, a LAN, WAN, or other computing network.

The components or modules that are shown as being stored in the memory device 1420 may be executed by the processor(s) 1412. The term "executable" may mean a program file that is in a form that may be executed by a processor 1412. For example, a program in a higher level language may be compiled into machine code in a format that may be loaded into a random access portion of the memory device 1420 and executed by the processor 1412, or source code may be loaded by another executable program and interpreted to generate instructions in a random access portion of the memory to be executed by a processor. The executable program may be stored in any portion or component of the memory device 1420. For example, the memory device 1420 may be random access memory (RAM), read only memory (ROM), flash memory, a solid state drive, memory card, a hard drive, optical disk, floppy disk, magnetic tape, or any other memory components.

The processor 1412 may represent multiple processors and the memory device 1420 may represent multiple memory units that operate in parallel to the processing circuits. This may provide parallel processing channels for the processes and data in the system. The local interface 1418 may be used as a network to facilitate communication between any of the multiple processors and multiple memories. The local interface 1418 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for requesting hypermedia resources from a hypermedia API (Application Program Interface), comprising:
   at least one processor;
   a memory device including instructions that, when executed by the at least one processor, cause the system to:
   receive an instruction requesting a first hypermedia resource from an API server, wherein the first hypermedia resource is included in a data schema that provides a structure for relations between the hypermedia resources;
   match the request for the first hypermedia resource with a request pattern of API requests for related hypermedia resources included in the data schema;
   identify a second hypermedia resource related to the first hypermedia resource included in the request pattern;
   generate an API request for the first hypermedia resource that includes hint data for the second hypermedia resource included in the request pattern, wherein the hint data provides the API server with notice that the second hypermedia resource may be requested in a later API request; and
   send the API request to the API server.

2. A system as in claim 1, wherein the memory device includes instructions that, when executed by the processor, cause the system to receive instructions from the API server specifying a time to send the later API request for the second hypermedia resource.

3. A system as in claim 1, wherein the memory device includes instructions that, when executed by the processor, cause the system to receive a data interchange format document returned in response to the API request that includes the first hypermedia resource and the second hypermedia resource.

4. A computer implemented method, comprising:
   receiving an instruction to request a first hypermedia resource from an API (Application Program Interface) server;
   identifying a second hypermedia resource that is related to the first hypermedia resource;
   calculating a probability that the second hypermedia resource will be requested;
   determining based at least in part on the probability that the second hypermedia resource will be requested; and
   generating an API request for the first hypermedia resource that includes hint data that identifies the second hypermedia resource.

5. A method as in claim 4, wherein including the hint data in the API request overrides a request pattern used by the API server to identify hypermedia resources to return to a client.

6. A method as in claim 4, further comprising tracking a progression of requests for related hypermedia resources to identify a request pattern used to calculate the probability that the second hypermedia resource will be requested.

7. A method as in claim 4, further comprising:
   identifying a request pattern for related hypermedia resources; and
   determining that a threshold of requests for the related hypermedia resources corresponding with the request pattern has been met, thereby allowing the probability to be calculated that the second hypermedia resource will be requested.

8. A method as in claim 7, wherein the threshold of requests comprises a number of requests for the related hypermedia resources that have characteristics that correspond to pattern characteristics of the request pattern.

9. A method as in claim 4, further comprising receiving a data interchange format document that includes the first hypermedia resource and a scheduled time to request the second hypermedia resource from the API server.

10. A method as in claim 9, wherein the scheduled time to request the second hypermedia resource from the API server is based in part on an anticipated request load on the API server.

11. A method as in claim 9, wherein the scheduled time to request the second hypermedia resource is based in part on an estimated time to prepare the second hypermedia resource to be provided to a client.

12. A method as in claim 4, wherein the hint data further identifies an alternative hypermedia resource associated with an alternative branch of a request pattern.

13. A method as in claim 12, further comprising receiving a data interchange format document that includes the first hypermedia resource and the alternative hypermedia resource associated with the alternative branch of the request pattern.

14. A method as in claim 4, further comprising evaluating a data interchange format document received from the API server to determine whether the data interchange format document includes the second hypermedia resource.

15. A method as in claim 14, further comprising:
   determining that the data interchange format document includes the second hypermedia resource; and
   caching the second hypermedia resource in client memory.

16. A method as in claim 15, further comprising:
   receiving a second instruction to request the second hypermedia resource from the API server; and
   retrieving the second hypermedia resource from the client memory.

17. A non-transitory machine readable storage medium having instructions embodied thereon, the instructions when executed by a processor:
- receive an instruction to request a hypermedia resource from an API server, wherein the hypermedia resource is associated with related hypermedia resources included in a data schema;
- identify the related hypermedia resources associated with the hypermedia resource;
- calculate probabilities that the related hypermedia resources will be requested in a subsequent request;
- determine based in part on the probabilities that a subsequent instruction will request at least one of the related hypermedia resources;
- generate an API request for the hypermedia resource that includes hint data for the at least one related hypermedia resource, wherein the API server uses the hint data to embed the at least one related hypermedia resource in a data interchange format document returned in response to the API request; and
- send the API request to the API server.

18. A non-transitory machine readable storage medium as in claim 17, wherein the instructions that when executed by the processor further obtain request history data associated with the request for the hypermedia resource, wherein the request history data includes a sequence of requests for the related hypermedia resources and the request history data is used to calculate the probabilities that the related hypermedia resources will be requested in a subsequent request.

19. A non-transitory machine readable storage medium as in claim 18, wherein the request history data is obtained from a remote server configured to maintain the request history data.

20. A non-transitory machine readable storage medium as in claim 17, wherein the instructions that when executed by the processor further obtain a request pattern associated with the request for the hypermedia resource from a remote server configured to analyze request history data to identify the request pattern, wherein the request pattern is used to calculate the probabilities that the related hypermedia resources will be requested in a subsequent request.

* * * * *